United States Patent
Hwang et al.

(10) Patent No.: US 11,838,871 B2
(45) Date of Patent: *Dec. 5, 2023

(54) METHOD AND DEVICE FOR CONTROLLING SIDELINK TRANSMISSION POWER IN NR V2X

(71) Applicant: LG Electronics Inc., Seoul (KR)

(72) Inventors: Daesung Hwang, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,391

(22) Filed: Sep. 23, 2022

(65) Prior Publication Data
US 2023/0015555 A1    Jan. 19, 2023

Related U.S. Application Data

(63) Continuation of application No. 17/513,310, filed on Oct. 28, 2021, now Pat. No. 11,457,412, which is a
(Continued)

(51) Int. Cl.
*H04W 52/14* (2009.01)
*H04L 5/00* (2006.01)
(Continued)

(52) U.S. Cl.
CPC .......... *H04W 52/14* (2013.01); *H04L 5/0048* (2013.01); *H04W 52/242* (2013.01); *H04W 52/367* (2013.01)

(58) Field of Classification Search
CPC . H04W 52/14; H04W 52/242; H04W 52/367; H04W 52/16; H04W 52/383;
(Continued)

(56) References Cited

U.S. PATENT DOCUMENTS 9,560,574 B2    1/2017   Chatterjee et al.
2019/0356451 A1  11/2019   Zhang et al.
(Continued)

FOREIGN PATENT DOCUMENTS

EP    3804418    4/2021
EP    3903437    11/2021
(Continued)

OTHER PUBLICATIONS

3GPP, "3rd Generation Partnership Project; Technical Specification Group Radio Access Network; Evolved Universal Terrestrial Radio access (E-UTRA); Physical layer procedures (Release 15)," 3GPP TS 36.213 V15.5.0, Mar. 2019, 10 pages.
(Continued)

*Primary Examiner* — Ricardo H Castaneyra
(74) *Attorney, Agent, or Firm* — Fish & Richardson P.C.

(57) ABSTRACT

Provided are a method in which a first device performs wireless communication, and a device supporting same. The method can comprise the steps of: deciding first power for physical sidelink shared channel (PSSCH) transmission in a second symbol duration; deciding second power for physical sidelink control channel (PSCCH) transmission in a first symbol interval on the basis of the first power; performing the PSCCH transmission to a second device in the first symbol duration on the basis of the second power; and performing the PSSCH transmission to the second device in the second symbol duration on the basis of the first power. The second symbol duration can comprise resources for the PSSCH transmission. The first symbol duration can comprise resources for the PSCCH transmission and the PSSCH transmission.

20 Claims, 23 Drawing Sheets

Related U.S. Application Data continuation of application No. PCT/KR2020/005346, filed on Apr. 23, 2020.

(60) Provisional application No. 62/839,762, filed on Apr. 28, 2019, provisional application No. 62/937,163, filed on Nov. 18, 2019, provisional application No. 62/938,247, filed on Nov. 20, 2019.

(51) Int. Cl.
*H04W 52/24* (2009.01)
*H04W 52/36* (2009.01)

(58) Field of Classification Search
CPC . H04W 52/325; H04W 52/42; H04W 52/346; H04W 92/18; H04W 4/40; H04L 5/0048
See application file for complete search history.

(56) References Cited

U.S. PATENT DOCUMENTS

| | | |
|---|---|---|
| 2020/0022089 A1 | 1/2020 | Guo |
| 2020/0228247 A1 | 7/2020 | Guo et al. |
| 2020/0314770 A1 | 10/2020 | Wu et al. |

FOREIGN PATENT DOCUMENTS

| | | |
|---|---|---|
| JP | 2022-525587 | 5/2022 |
| KR | 20120096408 | 8/2012 |
| KR | 20150027176 | 3/2015 |
| KR | 20180089435 | 8/2018 |
| KR | WO 2018174688 | 9/2018 |
| WO | WO2016021929 | 2/2016 |
| WO | WO2017176099 | 10/2017 |
| WO | WO 2018/228465 | 12/2018 |
| WO | WO 2020/164152 | 8/2020 |

OTHER PUBLICATIONS

Huawei et al., "Sidelink PHY structure and procedure for NR V2X," R1-1810138, 3GPP TSG RAN WG1 Meeting #94bis, Chengdu, China, Oct. 8-12, 2018, 15 pages.
Office Action in Japanese Appln. No. 2021-564308, dated Nov. 15, 2022, 10 pages (with English translation).
3GPP TS 36.213 V15.5.0 (Mar. 2019), "3 Generation Partnership Project; Technical Specification Group Radio Access Network; Evolved Universal Terrestrial Radio Access (E-UTRA); Physical layer procedures (Release 15)," Mar. 28, 2019, 57 pages.
3GPP TS 38.213 V15.5.0 (Mar. 2019), "3 Generation Partnership Project; Technical Specification Group Radio Access Network; NR; Physical layer procedures for control (Release 15)," Mar. 27, 2019, 104 pages.
Extended European Search Report in European Application No. 20799588.7, dated May 9, 2022, 14 pages.
Huawei et al., "Power control and power sharing for V2X sidelink," 3GPP TSG RAN WG1 Meeting #96bis, R1-1904691, Xi'an, China, Apr. 8-12, 2019, 6 pages.
Office Action in Korean Application No. 10-2021-7034391, dated Jul. 20, 2022, 12 pages (with English translation).
Panasonic, "Discussion on physical layer procedures for sidelink in NR V2X," 3GPP TSG RAN WG1 #96bis, R1-1905382, Xi'an, China, Apr. 8-12, 2019, 5 pages.
Samsung, "Considerations on Sidelink Power Control," 3GPP TSG RAN WG1 #96, R1-1902286, Athens, Greece, Feb. 25-Mar. 1, 2019, 7 pages.

FIG. 4
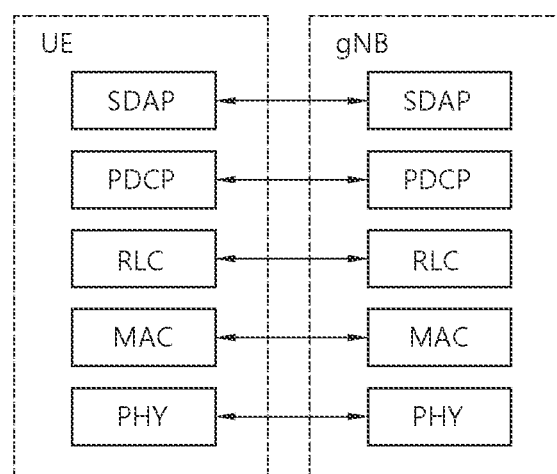
(a)
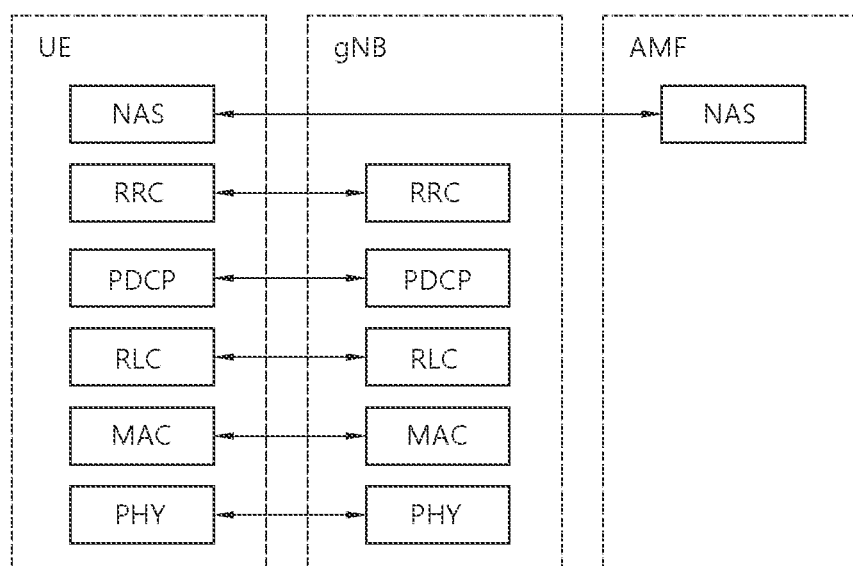
(b)

FIG. 8
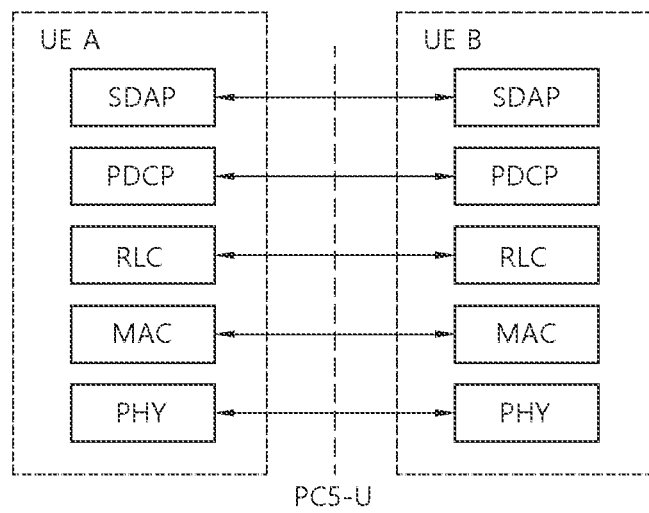
(a)
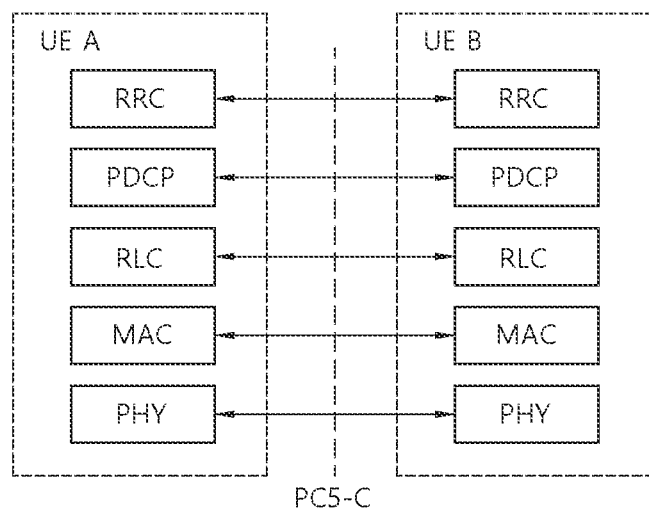
(b)

METHOD AND DEVICE FOR CONTROLLING SIDELINK TRANSMISSION POWER IN NR V2X

CROSS-REFERENCE TO RELATED APPLICATIONS

This application is a continuation of U.S. application Ser. No. 17/513,310, filed on Oct. 28, 2021, which is a continuation pursuant to 35 U.S.C. § 119(e) of International Application PCT/KR2020/005346, with an international filing date of Apr. 23, 2020, which claims the benefit of U.S. Provisional Patent Application No. 62/839,762, filed on Apr. 28, 2019, U.S. Provisional Patent Application No. 62/937,163, filed on Nov. 18, 2019, and U.S. Provisional Patent Application No. 62/938,247, filed on Nov. 20, 2019, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in NR V2X, PSCCH resource(s) may be allocated in a form surrounded by PSSCH resource(s). In this case, a UE may have to simultaneously transmit a PSSCH and a PSCCH in a first time period, and the UE may have to transmit only the PSSCH without the PSCCH in a second time period. In this case, the UE needs to efficiently determine power for PSSCH transmission and PSCCH transmission in the first time period and the second time period.

Technical Solutions

In one embodiment, a method for performing wireless communication by a first device is provided. The method may comprise: determining a first power for physical sidelink shared channel (PSSCH) transmission in a second symbol period; determining a second power for physical sidelink control channel (PSCCH) transmission in a first symbol period based on the first power; performing, to a second device, the PSCCH transmission in the first symbol period based on the second power; and performing, to the second device, the PSSCH transmission in the second symbol period based on the first power. Herein, the second symbol period may include resources for the PSSCH transmission, and the first symbol period may include resources for the PSCCH transmission and the PSSCH transmission.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: determine a first power for physical sidelink shared channel (PSSCH) transmission in a second symbol period; determine a second power for physical sidelink control channel (PSCCH) transmission in a first symbol period based on the first power; perform, to a second device, the PSCCH transmission in the first symbol period based on the second power; and perform, to the second device, the PSSCH transmission in the second symbol period based on the first power. Herein, the second symbol period may include resources for the PSSCH transmission, and the first symbol period may include resources for the PSCCH transmission and the PSSCH transmission.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
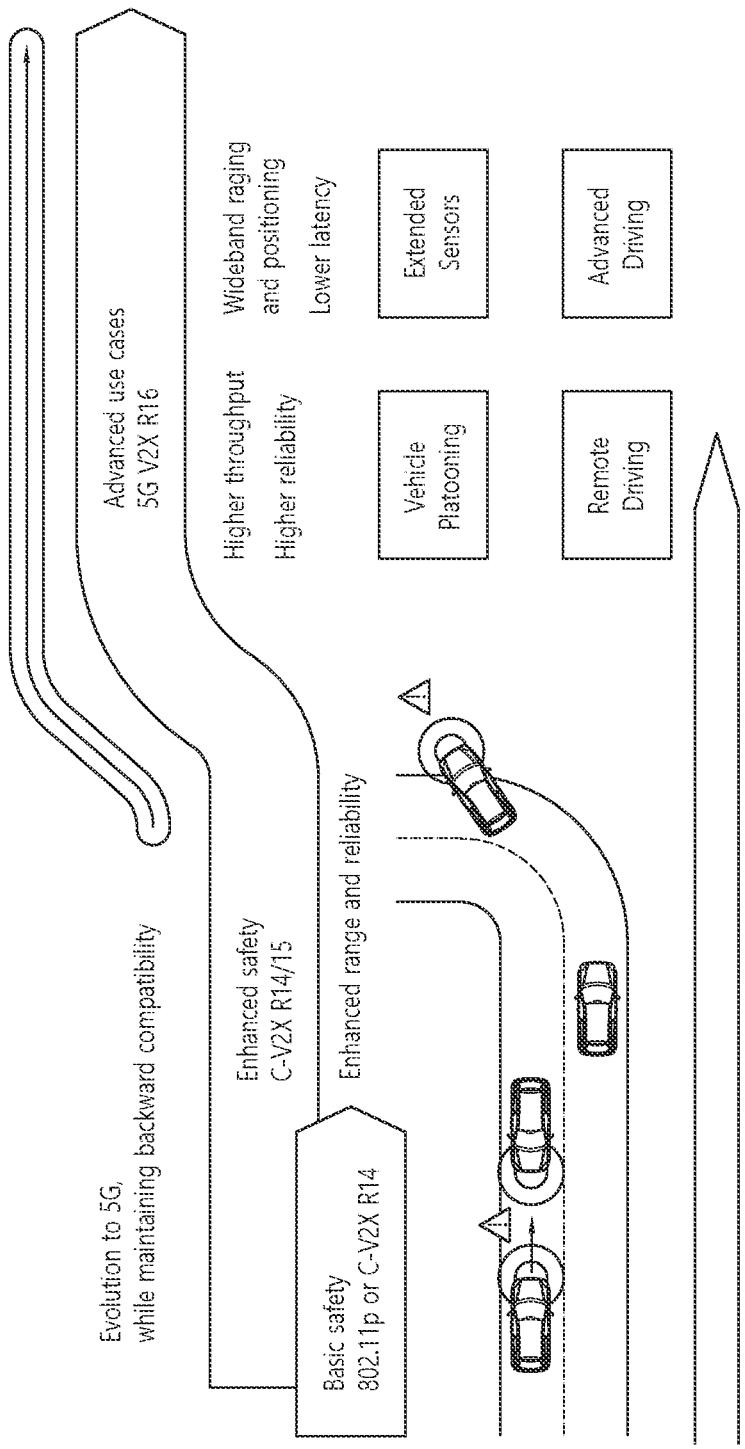
FIG. 1 is a drawing for describing V2X communication based on NR, compared to V2X communication based on RAT used before NR.

In the present disclosure, "A or B" may mean "only A", "only B" or "both A and B." In other words, in the present disclosure. "A or B" may be interpreted as "A and/or B". For example, in the present disclosure. "A, B, or C" may mean "only A", "only B", "only C", or "any combination of A, B, C".

A slash (/) or comma used in the present disclosure may mean "and/or". For example, "A/B" may mean "A and/or B". Accordingly. "A/B" may mean "only A", "only B", or "both A and B". For example, "A, B, C" may mean "A, B, or C".

In the present disclosure. "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure. "at least one of A, B, and C" may mean "only A", "only B", "only C", or "any combination of A, B, and C". In addition. "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
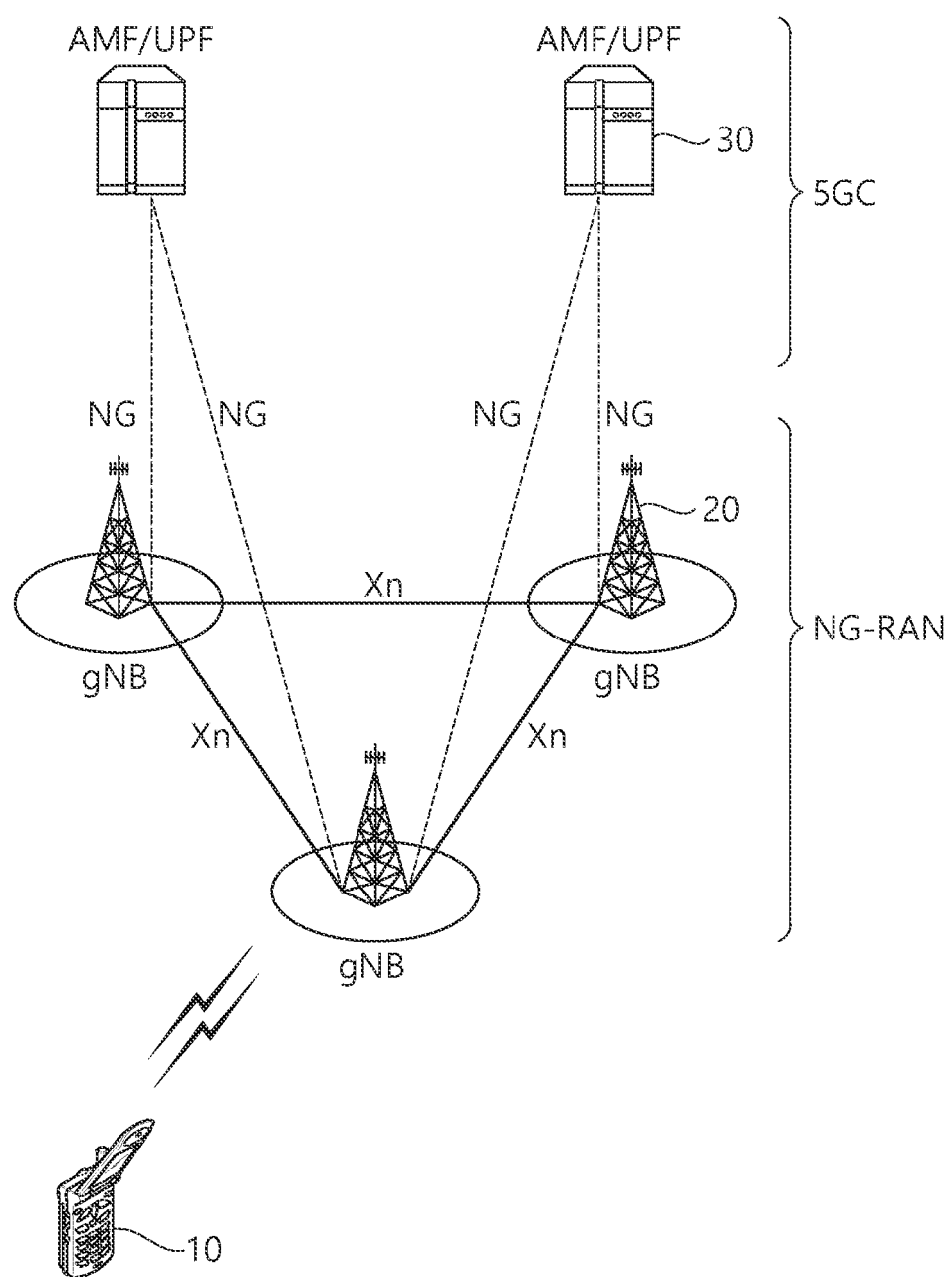
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
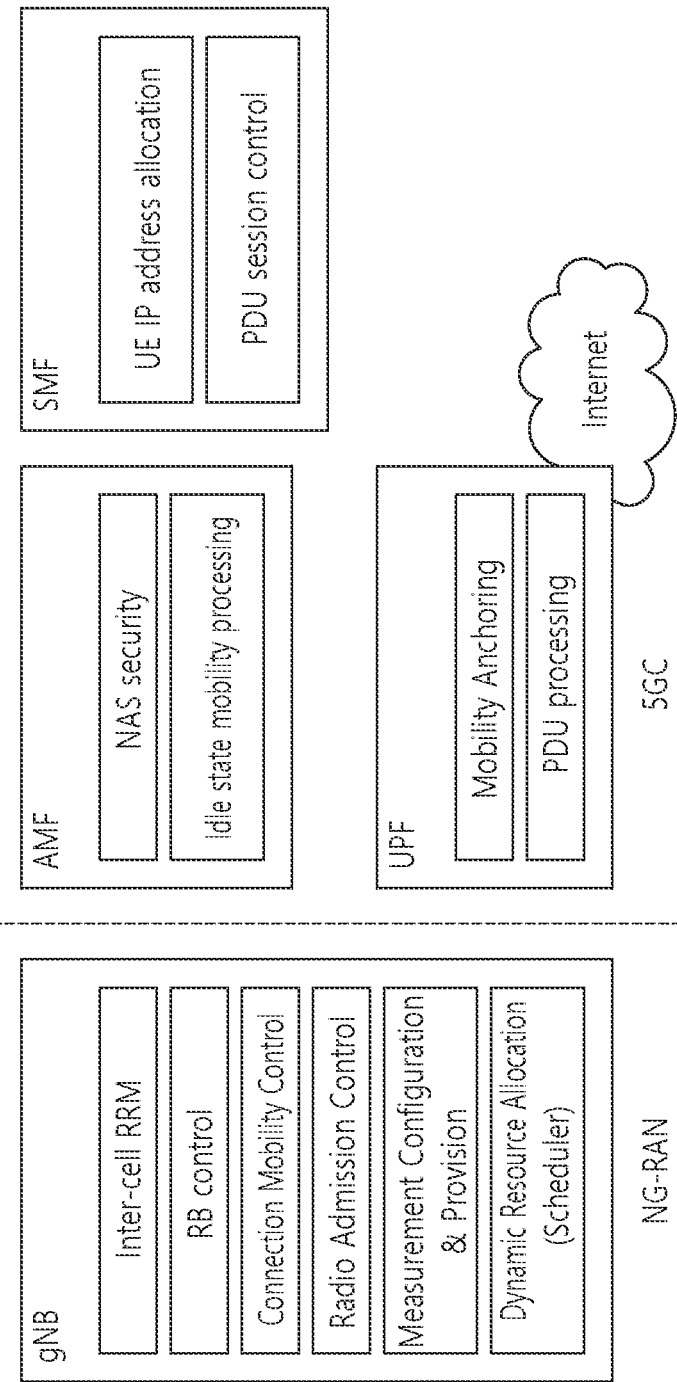
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. AUPF may provide functions, such as Mobility Anchoring, Protocol Data Unit (PDU) processing, and so on. A Session Management Function (SMF) may provide functions, such as user equipment (UE) Internet Protocol (IP) address allocation. PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(*a*) shows a radio protocol architecture for a user plane, and FIG. 4(*b*) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
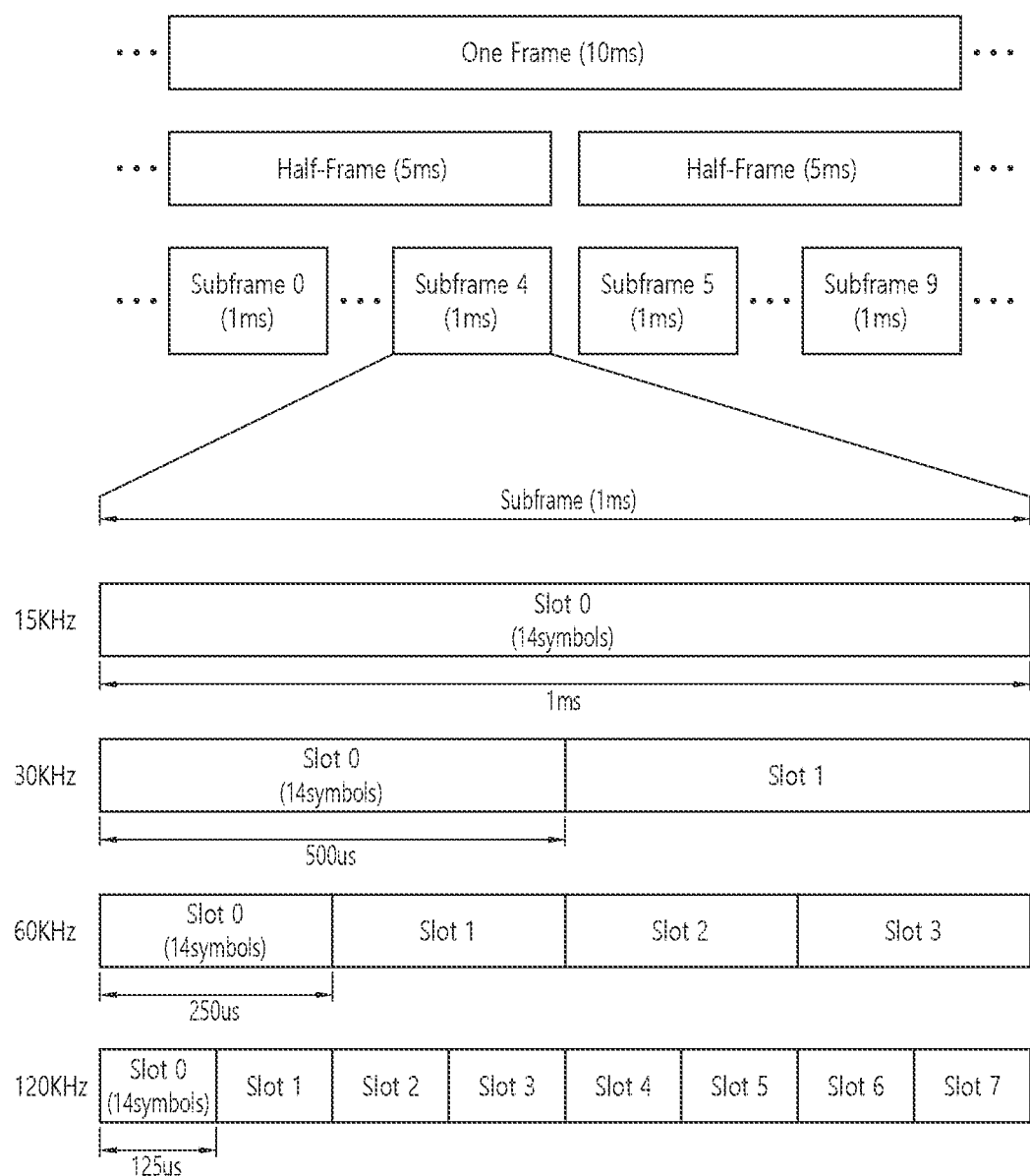
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of IOms and may be defined to be configured of two half-frames (HFs). A half-frame may include five ims subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * 2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * 2$^u$) | $N^{slot}_{symb}$ | $N^{frame,u}_{slot}$ | $N^{subframe,u}_{slot}$ |
|---|---|---|---|
| KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the system may e changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
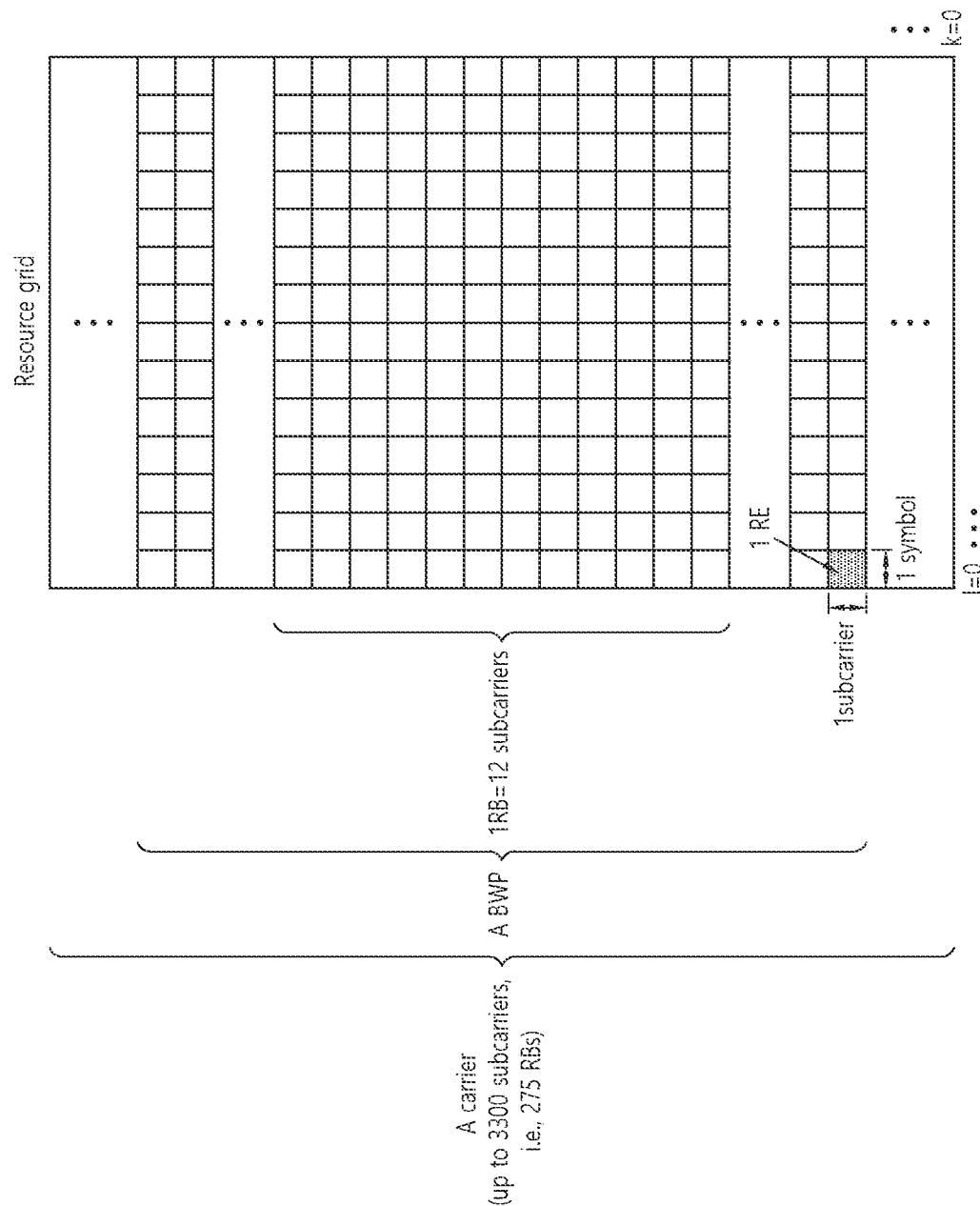
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
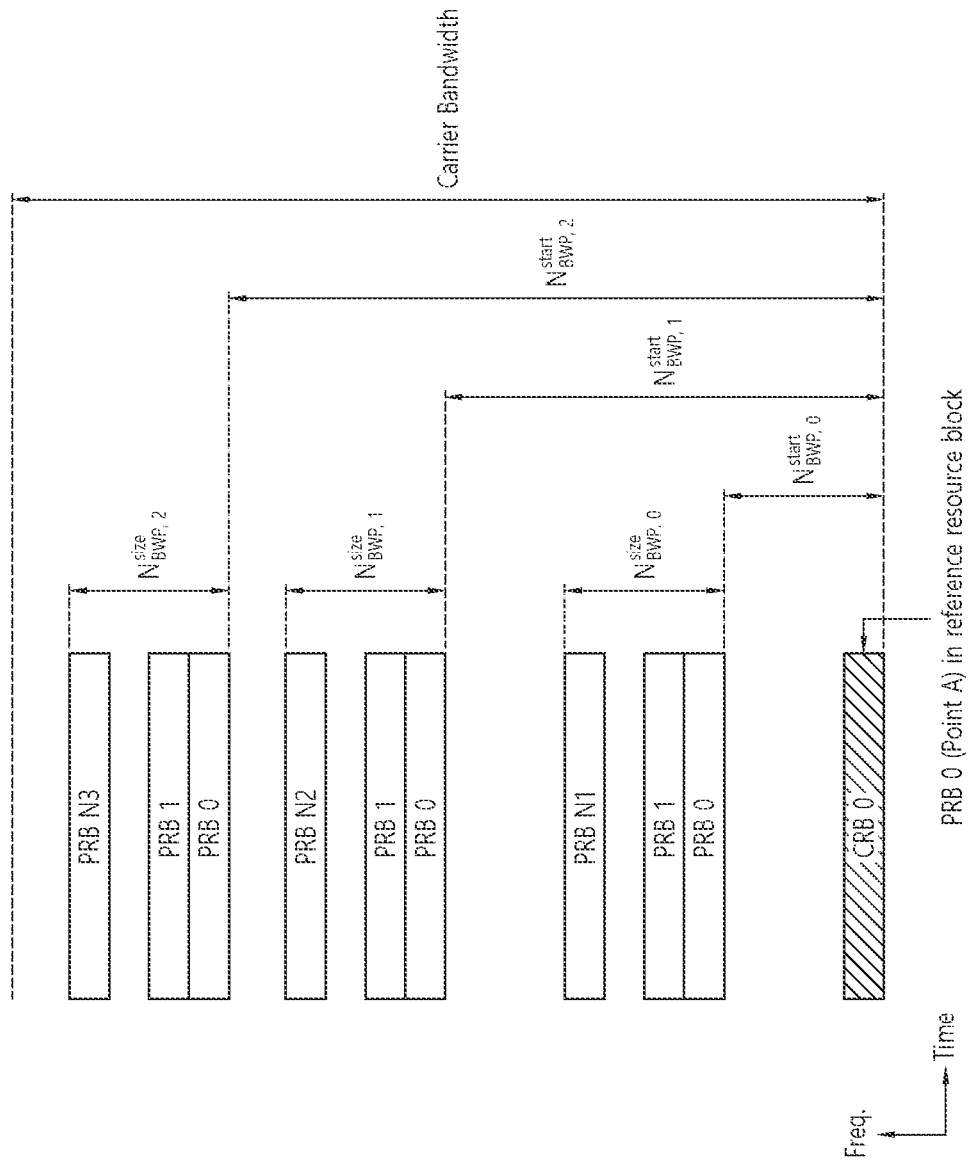
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
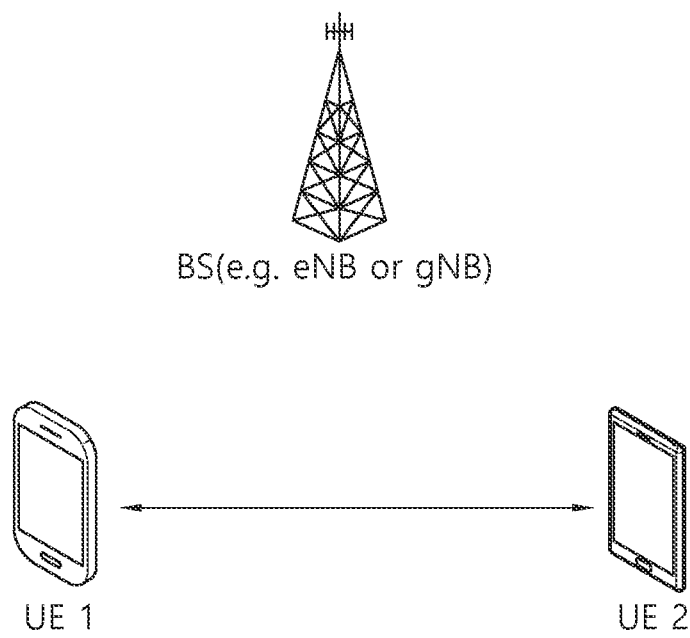
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
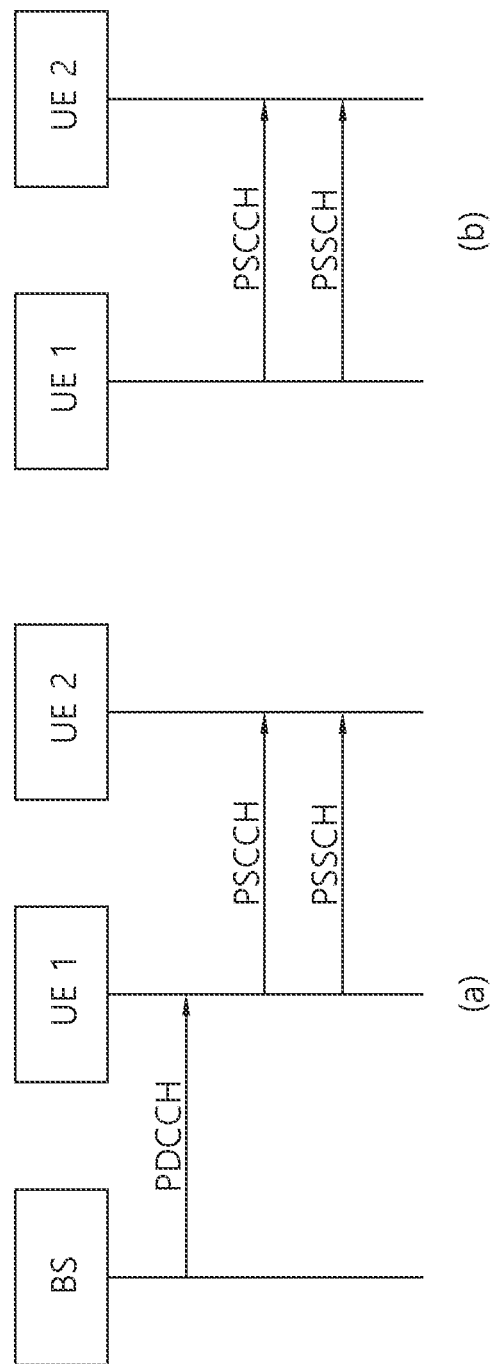
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
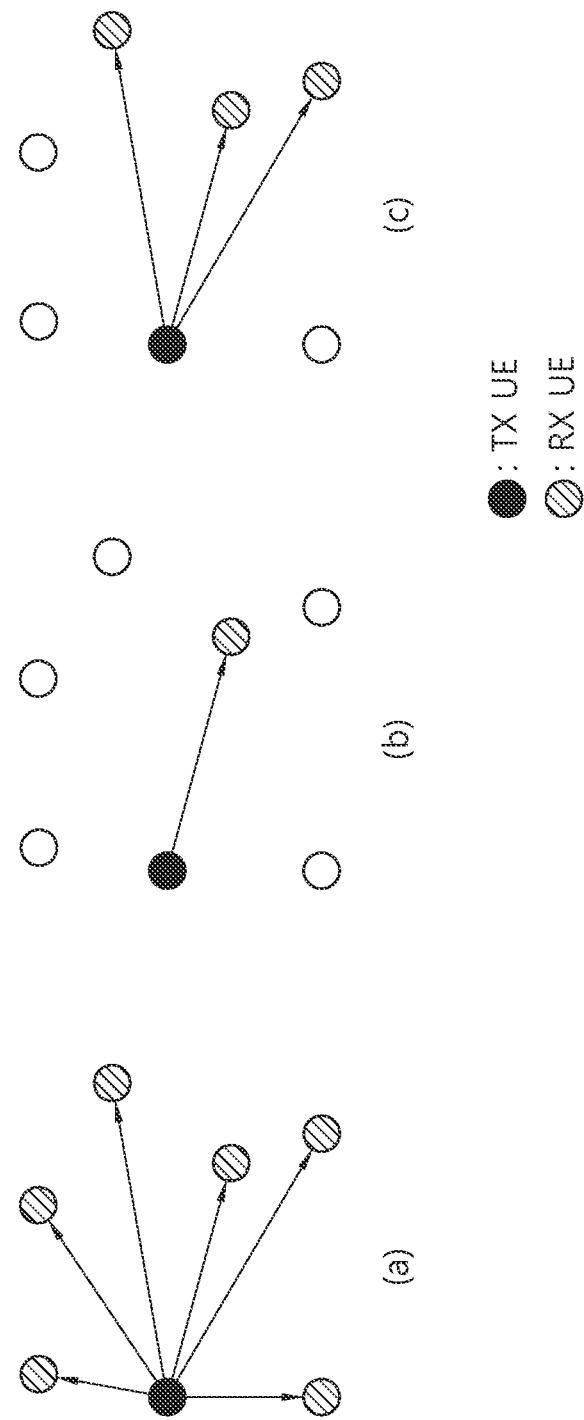
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, power control will be described.

A method in which a UE controls uplink transmit power thereof may include open loop power control (OLPC) and closed loop power control (CLPC). Based on the OLPC, the UE may estimate a downlink pathloss from a BS of a cell to which the UE belongs, and the UE may perform power control in such a manner that the pathloss is compensated for. For example, based on the OLPC, if a distance between the UE and the BS further increases and thus a downlink pathloss increases, the UE may control uplink power in such a manner that uplink transmit power is further increased. Based on the CLPC, the UE may receive information (e.g., a control signal) required to adjust uplink transmit power from the BS, and the UE may control uplink power based on the information received from the BS. That is, based on the CLPC, the UE may control the uplink power based on a direct power control command received from the BS.

The OLPC may be supported in SL. Specifically, when the transmitting UE is inside the coverage of the BS, the BS may enable OPLC for unicast, groupcast, and broadcast transmission based on the pathloss between the transmitting UE and a serving BS of the transmitting UE. If the transmitting UE receives information/configuration for enabling the OLPC from the BS, the transmitting UE may enable OLPC for unicast, groupcast, or broadcast transmission. This may be to mitigate interference for uplink reception of the BS.

Additionally, at least in case of unicast, a configuration may be enabled to use the pathloss between the transmitting UE and the receiving UE. For example, the configuration may be pre-configured for the UE. The receiving UE may report an SL channel measurement result (e.g., SL RSRP) to the transmitting UE, and the transmitting UE may derive pathloss estimation from the SL channel measurement result reported by the receiving UE. For example, in SL, if the transmitting UE transmits a reference signal to the receiving UE, the receiving UE may estimate a channel between the transmitting UE and the receiving UE based on the reference signal transmitted by the transmitting UE. In addition, the receiving UE may transmit the SL channel measurement result to the transmitting UE. In addition, the transmitting UE may estimate the SL pathloss from the receiving UE based on the SL channel measurement result. In addition, the transmitting UE may perform SL power control by compensating for the estimated pathloss, and may perform SL transmission for the receiving UE. Based on the OLPC in SL, for example, if a distance between the transmitting UE and the receiving UE further increases and thus the SL pathloss increases, the transmitting UE may control SL transmit power in such a manner that the SL transmit power is further increased. The power control may be applied in SL physical channel (e.g., PSCCH, PSSCH, physical sidelink feedback channel (PSFCH)) and/or SL signal transmission.

In order to support the OLPC, at least in case of unicast, long-term measurement (e.g., L3 filtering) may be supported on SL.

For example, total SL transmit power may be identical in symbols used for PSCCH and/or PSSCH transmission in a slot. For example, maximum SL transmit power may be configured for the transmitting UE or may be pre-configured.

For example, in case of the SL OLPC, the transmitting UE may be configured to use only a downlink pathloss (e.g., a pathloss between the transmitting UE and the BS). For example, in case of the SL OLPC, the transmitting UE may be configured to use only an SL pathloss (e.g., a pathloss between the transmitting UE and the receiving UE). For example, in case of the SL OLPC, the transmitting UE may be configured to use a downlink pathloss and the SL pathloss.

For example, if the SL OLPC is configured to use both the downlink pathloss and the SL pathloss, the transmitting UE may determine a minimum value as transmit power among power obtained based on the downlink pathloss and power obtained based on the SL pathloss. For example, P0 and an alpha value may be configured separately for the downlink pathloss and the SL pathloss or may be pre-configured. For example, P0 may be a user-specific parameter related to signal to interference plus noise ratio (SINR) received on average. For example, the alpha value may be a weight value for the pathloss.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 12:
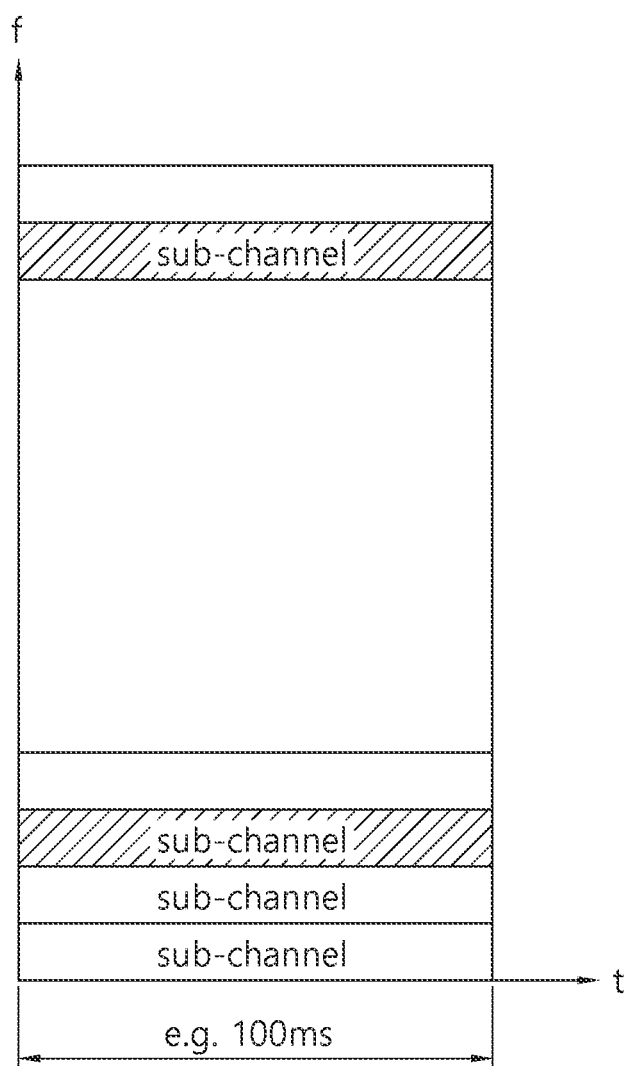
FIG. 12 shows a resource unit for CBR measurement, based on an embodiment of the present disclosure.

FIG. 12 shows a resource unit for CBR measurement, based on an embodiment of the present disclosure. The embodiment of FIG. 12 may be combined with various embodiments of the present disclosure.

Referring to FIG. 12, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 12, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than 1, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Meanwhile, in order to increase the usage efficiency of resources for data, a form in which resource(s) for a PSCCH is surrounded by resource(s) for a PSSCH may be supported in the next communication system.

Figure 13:
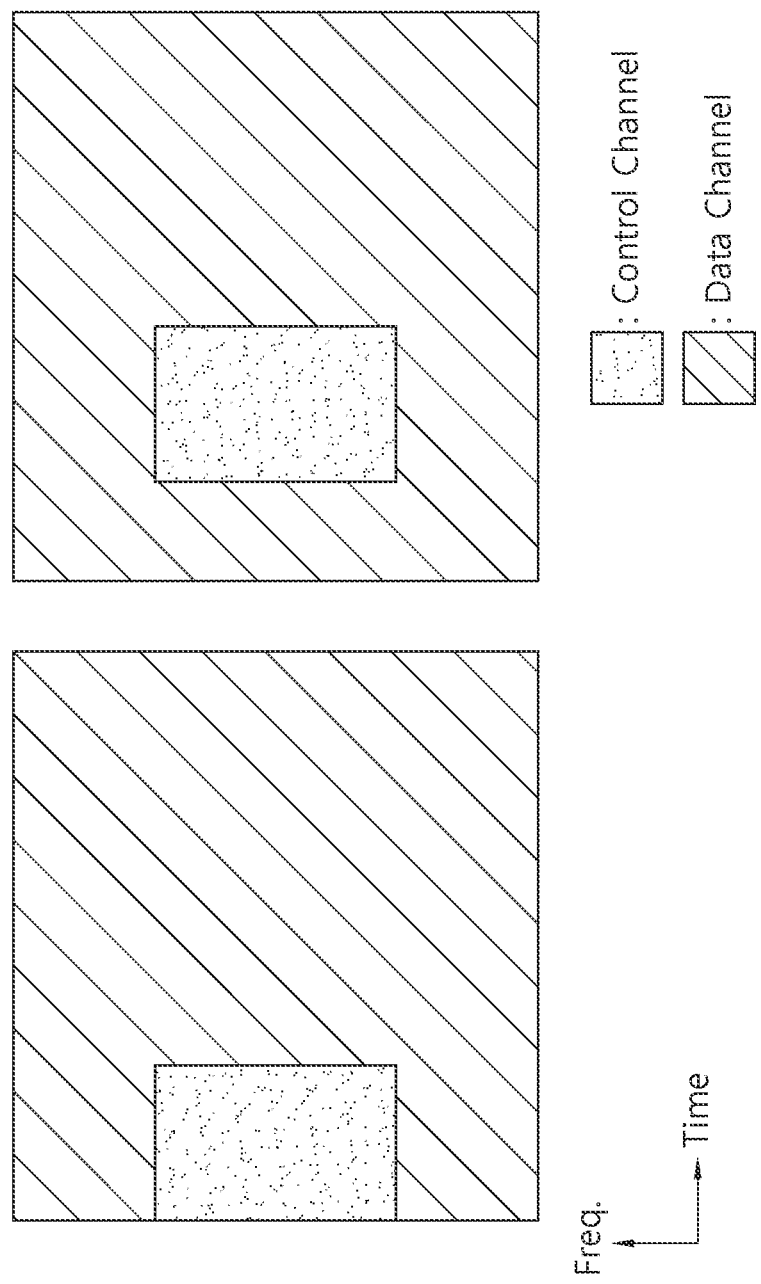
FIG. 13 shows resource allocation for a data channel or a control channel, based on an embodiment of the present disclosure.

FIG. 13 shows resource allocation for a data channel or a control channel, based on an embodiment of the present disclosure. The embodiment of FIG. 13 may be combined with various embodiments of the present disclosure.

Referring to FIG. 13, resource(s) for a control channel (e.g., PSCCH) may be allocated in a form surrounded by resource(s) for a data channel (e.g., PSSCH).

Meanwhile, from the viewpoint of a transmitting UE, in order to prevent a transient period between PSCCH/PSSCH transmission from occurring, at least total transmit power needs to be kept constant during a period of the PSCCH/PSSCH transmission. From the viewpoint of a receiving UE, in order to prevent an additional Automatic Gain Control (AGC) period from occurring between PSCCH/PSSCH reception, at least total transmit power needs to be kept constant during a period of the PSCCH/PSSCH transmission.

In addition, since a PSCCH can be used for a sensing operation of UE(s) in addition to a UE desiring to receive a PSSCH, a coverage of the PSCCH needs to be guaranteed at a certain level. To this end, when configuring power for transmitting the PSCCH, boosting of Power Spectrum Density (PSD) or transmit power may be considered. If Energy Per Resource Element (EPRE) or PSD for the PSSCH is different for each symbol, for example, if EPRE or PSD for the PSSCH is different for each symbol depending on a region in which the PSCCH and the PSSCH are frequency division multiplexed (FDMed) and other regions. QAM demodulation may be ineffective or inefficient if a receiving UE cannot know the corresponding change value.

Accordingly, there may be a need for a method for a transmitting UE to efficiently control SL transmit power. Hereinafter, based on an embodiment of the present disclosure, a method for controlling SL transmit power and an apparatus supporting the same will be described.

Based on an embodiment of the present disclosure, a Channel State Information Reference Signal(s) (CSI-RS(s)) for SL may be defined. For example, a UE may obtain Channel State Information (CSI) for SL or V2X based on the CSI-RS(s). For example, the CSI for SL or V2X may include at least one of Channel Quality Indicator (CQI), Precoding Matrix Indicator (PMI), Rank Indicator (RI), RSRP, RSRQ, path gain, path loss, CSI-RS resource indicator (CRI), an interference condition, or a vehicle motion. For example, the CSI-RS(s) may be transmitted surrounded by PSSCH (time and frequency) resource(s). Based on an embodiment of the present disclosure, a receiving UE may know reference transmit power for the CSI-RS(s), and the receiving UE may estimate CQI and/or RI based on the CSI-RS(s).

Based on an embodiment of the present disclosure, a transmitting UE may transmit at least one of a PSCCH, CSI-RS(s), or Phase Tracking Reference Signal(s) (PT-RS(s)) by confining it within time and frequency resource(s) of a PSSCH. For example, the PSCCH, the CSI-RS(s), or the PT-RS(s) may be transmitted surrounded by the PSSCH. The PT-RS(s) may be reference signal(s) used for phase compensation for the PSSCH. For example, the PT-RS(s) may be mapped to time/frequency resource(s) (e.g., resource element(s)) in consideration of a time density defined according to a scheduled MCS and/or a frequency density defined according to a scheduled bandwidth. If the PSCCH, the CSI-RS(s), or the PT-RS(s) is transmitted and received by being surrounded by the PSSCH, problem(s) of a transient period, an additional AGC period, and/or an inter band emission (IBE) may be avoided.

Also, based on an embodiment of the present disclosure, EPRE for PT-RS(s) may be configured to be the same as EPRE for a PSSCH mapped to the same symbol. Therefore, in the following embodiments of the present disclosure, the PSSCH mapping region may include PT-RS(s) or may not include PT-RS(s). The EPRE may be energy or power allocated to one resource element (RE). In the following embodiments, transmitting a PSSCH by a UE may include transmitting PT-RS(s) by the UE. For example, a ratio between PT-RS EPRE and PSSCH EPRE may be defined or determined by at least one of the number of PSSCH layers or the number of PT-RS ports, and may be configured or pre-configured for the UE.

Figure 14:
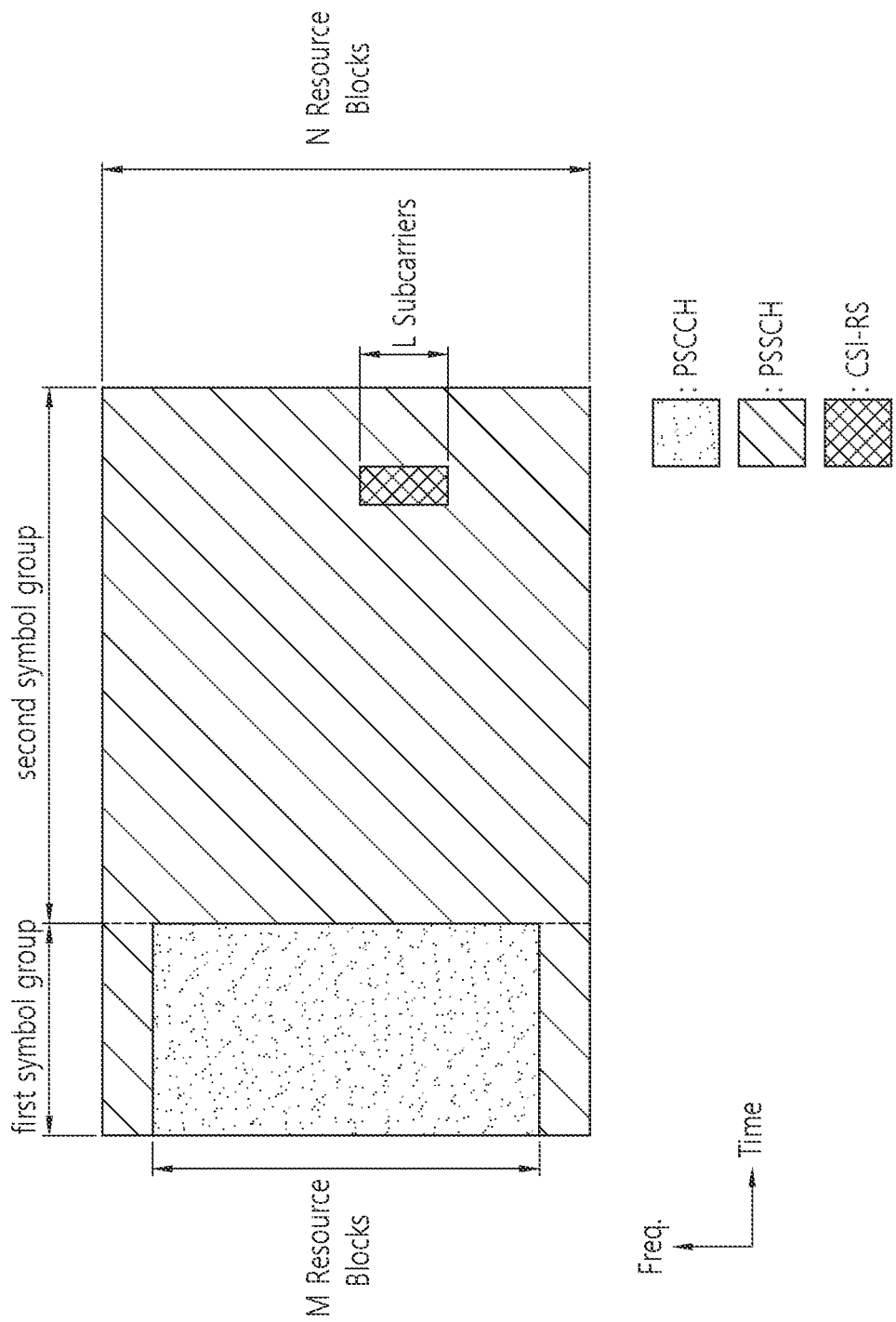
FIG. 14 shows an example in which a PSCCH, a PSSCH, and CSI-RS(s) are allocated, based on an embodiment of the present disclosure.

FIG. 14 shows an example in which a PSCCH, a PSSCH, and CSI-RS(s) are allocated, based on an embodiment of the present disclosure. The embodiment of FIG. 14 may be combined with various embodiments of the present disclosure.

Referring to FIG. 14, it is assumed that the PSCCH is transmitted through M resource blocks (RBs). It is assumed that the PSSCH is transmitted through N resource blocks. It is assumed that transmit power boosting for the PSCCH is X [dB]. For example, the X value may be a fixed value (in the system). For example, the X value may be a (pre-) configured value for a UE. In the present disclosure, a linear value of X [dB] may be expressed as X. For example, the relationship between X and X' may be defined by Equation 1 or Equation 2.

$$X' = 10^{X/10} \quad \text{[Equation 1]}$$

$$10 \log_{10} X' = X \quad \text{[Equation 2]}$$

Referring back to FIG. 14, it is assumed that the CSI-RS(s) is transmitted through L subcarriers. In the present disclosure, a set of symbols in which the PSCCH and the PSSCH are FDMed may be referred to as a first symbol group. That is, a set of symbols in which the PSCCH and the PSSCH are transmitted through different frequencies at the same time may be referred to as a first symbol group. In addition, a set of symbols in which the PSSCH is transmitted and the PSCCH is not transmitted may be referred to as a second symbol group. For example, the UE may transmit the PSCCH and the PSSCH in a first symbol period, and the UE may transmit the PSSCH in a second symbol period. For example, the first symbol period may be referred to as a PSCCH-PSSCH transmission occasion. Hereinafter, a method for the UE to perform power control for the PSCCH, the PSSCH and/or the CSI-RS(s) will be described in more detail.

Figure 15:
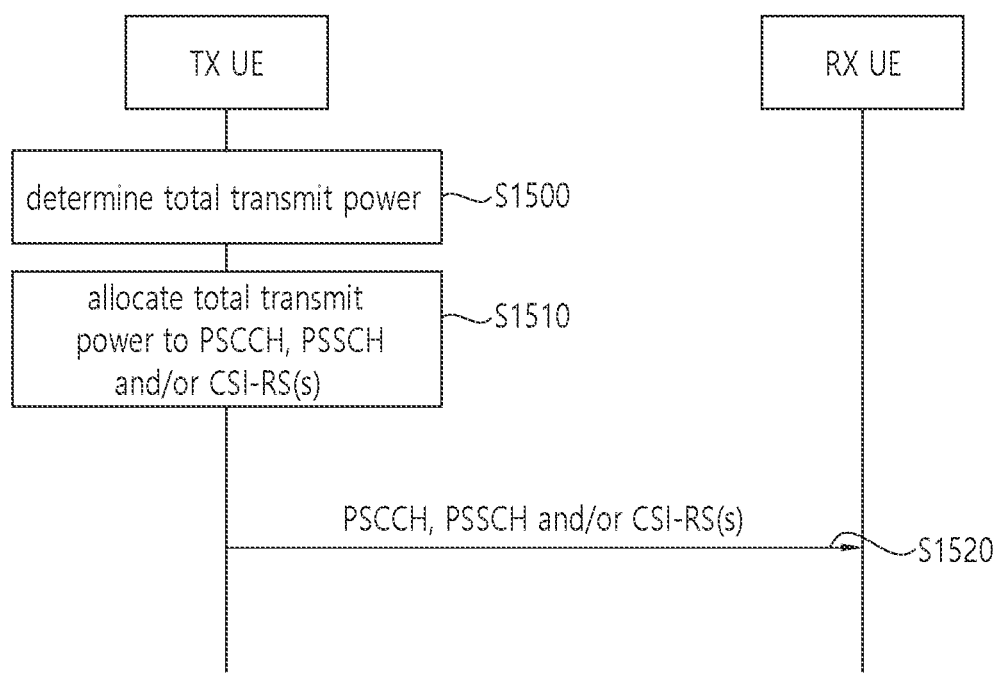
FIG. 15 shows a procedure in which a transmitting UE performs power control, based on an embodiment of the present disclosure.

FIG. 15 shows a procedure in which a transmitting UE performs power control, based on an embodiment of the present disclosure. The embodiment of FIG. 15 may be combined with various embodiments of the present disclosure.

Referring to FIG. 14 and FIG. 15, in step S1500, the transmitting UE may determine/calculate total transmit power. For example, the total transmit power may be transmit power to be applied to at least one of a PSCCH, a PSSCH, CSI-RS(s), and PT-RS(s).

Based on an embodiment of the present disclosure, the transmitting UE may configure total transmit power based on configured power. $P_{CMAX}$, and/or power required for the PSSCH. For example, the configured power may be used in a specific situation (e.g., NR sidelink mode 2 operation and/or combination of mode 1 and mode 2 operation). For example, the transmitting UE may determine/calculate total transmit power based on Equation 3. For example, the transmitting UE may determine/calculate total transmit power based on Equation 4.

$$P_{SL} = P_{PSSCH} = \min(P_{CMAX}, P_{MAX\_CBR}, 10 \log_{10}(N) + P_{O\_PSSCH} + \alpha_{PSSCH} \cdot PL) \quad \text{[Equation 3]}$$

$$P_{SL} = P_{PSSCH} = \min(P_{CMAX}, P_{MAX\_CBR}, 10 \log_{10}(2^u N) + P_{O\_PSSCH} + \alpha_{PSSCH} \cdot PL \quad \text{[Equation 4]}$$

Herein, $P_{SL}$ may be a total transmit power value, and $P_{PSSCH}$ may be a total transmit power value determined based on the PSSCH. $P_{CMAX}$ may be a maximum UE transmit power value, $P_{MAX\_CBR}$ may be a maximum transmit power value based on CBR, and N may be the number of resource blocks in which the PSSCH is transmitted. For example, $P_{CMAX}$ may be a maximum UE transmit power value for each carrier related to SL communication. For example, $P_{CMAX}$ may be a maximum UE transmit power value for each serving cell related to SL communication. For example, $P_{MAX\_CBR}$ may be a maximum transmit power value for each bandwidth part (BWP) in which SL communication based on CBR is activated. For example, $P_{MAX\_CBR}$ may be a maximum transmit power value for each carrier related to SL communication based on CBR. For example, $P_{MAX\_CBR}$ may be a maximum transmit power value for each serving cell related to SL communication based on CBR. $P_{O\_PSSCH}$ and/or $\alpha_{PSSCH}$ may be values pre-defined in the system or (pre-)configured for the UE, and PL may be at least one of the downlink pathloss and the sidelink pathloss. For example, the maximum UE transmit power value may be a value to which maximum power reduction (MPR) according to the implementation of the UE is applied to the configured maximum UE output power, u may indicate/represent a subcarrier size and/or a CP length (i.e., numerology). For example, in the case of a 15 kHz subcarrier size, u=0. For example, in the case of a 30 kHz subcarrier size, u=1. For example, the relationship between the subcarrier size and u may refer to Table 1 or Table 2. In the case of the UE operating in SL mode 1, $P_{MAX\_CBR}$ may be omitted in the above equation.

Based on the above method, the transmitting UE may determine total transmit power based on the PSSCH. Accordingly, in the case of using power boosting for the PSCCH, and/or in the case of the difference between the number of resource blocks for the PSCCH and the number of resource blocks for the PSSCH being less than or equal to a certain level, a coverage of the PSCCH may be limited.

Based on an embodiment of the present disclosure, the transmitting UE may configure total transmit power based on configured power, $P_{CMAX}$, and/or power required for the PSCCH. For example, the configured power may be used in a specific situation (e.g., NR sidelink mode 2 operation and/or combination of mode 1 and mode 2 operation). For example, the transmitting UE may determine/calculate total transmit power based on Equation 5.

$$P_{SL} = P_{PSCCH} = \min(P_{CMAX}, P_{MAX\_CBR}, 10 \log_{10}(X'M) + P_{O\_PSCCH} + \alpha_{PSCCH} \cdot PL) \quad \text{[Equation 5]}$$

Herein, $P_{SL}$ may be a total transmit power value, and $P_{PSCCH}$ may be a total transmit power value determined based on the PSCCH. $P_{CMAX}$ may be a maximum UE transmit power value, and $P_{MAX\_CBR}$ may be a maximum transmit power value based on CBR. If transmit power boosting for the PSCCH is X [dB], X' may be a linear value of X. M may be the number of resource blocks in which the PSCCH is transmitted. $P_{O\_PSCCH}$ and/or $\alpha_{PSCCH}$ may be values pre-defined in the system or (pre-)configured for the UE, and PL may be at least one of the downlink pathloss and the sidelink pathloss. For example, the maximum UE transmit power value may be a value to which maximum power reduction (MPR) according to the implementation of the UE is applied to the configured maximum UE output power. In the case of the UE operating in SL mode 1. $P_{MAX\_CBR}$ may be omitted in the above equation.

Based on the above method, the transmitting UE may determine total transmit power based on the PSCCH. Therefore, in the symbol region in which the PSCCH and the PSSCH are FDMed, the transmitting UE may not be able to allocate power to the PSSCH. Alternatively, in order for the transmitting UE to allocate power to the PSSCH in the symbol region in which the PSCCH and the PSSCH are FDMed, a coverage of the PSCCH may be limited. Therefore, in order to solve the above problem, the transmitting UE may additionally consider a scaling factor. Equation 6 or Equation 7 shows an example of transmit power in consideration of a scaling factor.

$$P_{SL} = P_{PSCCH} = \min(P_{CMAX}, P_{MAX\_CBR}, 10 \log_{10}(\beta X'M) + P_{O\_PSCCH} + \alpha_{PSCCH} \cdot PL) \quad \text{[Equation 6]}$$

Herein, $P_{SL}$ may be a total transmit power value, and $P_{PSCCH}$ may be a total transmit power value determined based on the PSCCH. $P_{CMAX}$ may be a maximum UE transmit power value, and $P_{MAX\_CBR}$ may be a maximum transmit power value based on CBR. $\beta$ may be a real number greater than 1. If transmit power boosting for the PSCCH is X [dB], X' may be a linear value of X. M may be the number of resource blocks in which the PSCCH is transmitted. $P_{O\_PSCCH}$ and/or $\alpha_{PSCCH}$ may be values pre-defined in the system or (pre-)configured for the UE, and PL may be at least one of the downlink pathloss and the sidelink pathloss. For example, the maximum UE transmit power value may be a value to which maximum power reduction (MPR) according to the implementation of the UE is applied to the configured maximum UE output power. In the case of the UE operating in SL mode 1, $P_{MAX\_CBR}$ may be omitted in the above equation.

$$P_{SL} = P_{PSCCH} = \min(P_{CMAX}, P_{MAX\_CBR}, 10 \log_{10}(X'M + \beta) + P_{O\_PSCCH} + \alpha_{PSCCH} \cdot PL) \quad \text{[Equation 7]}$$

Herein, $P_{SL}$ may be a total transmit power value, and $P_{PSCCH}$ may be a total transmit power value determined based on the PSCCH. $P_{CMAX}$ may be a maximum UE transmit power value, and $P_{MAX\_CBR}$ may be a maximum transmit power value based on CBR. $\beta$ may be a positive real number. If transmit power boosting for the PSCCH is X [dB], X' may be a linear value of X. M may be the number of resource blocks in which the PSCCH is transmitted. $P_{O\_PSCCH}$ and/or $\alpha_{PSCCH}$ may be values pre-defined in the system or (pre-)configured for the UE, and PL may be at least one of the downlink pathloss and the sidelink pathloss. For example, the maximum UE transmit power value may be a value to which maximum power reduction (MPR) according to the implementation of the UE is applied to the configured maximum UE output power. In the case of the UE operating in SL mode 1. $P_{MAX\_CBR}$ may be omitted in the above equation.

Based on an embodiment of the present disclosure, the transmitting UE may configure total transmit power based on configured power. $P_{CMAX}$, and/or power required for a PSXCH. For example, the power required for the PSXCH may include power required for the PSCCH and/or power required for the PSSCH. For example, the configured power may be used in a specific situation (e.g., NR sidelink mode 2 operation and/or combination of mode 1 and mode 2 operation). For example, the transmitting UE may determine/calculate total transmit power based on Equation 8.

$$P_{SL} = P_{PSCCH\_PSSCH} = \min(P_{CMAX}, P_{MAX\_CBR}, 10 \log_{10}(X'M + Y'(N-M)) + P_{O\_PSXCH} + \alpha_{PSXCH} \cdot PL) \quad \text{[Equation 8]}$$

Herein, $P_{SL}$ may be a total transmit power value, and $P_{PSCCH\_PSSCH}$ may be a total transmit power value determined based on the PSCCH and the PSSCH. $P_{CMAX}$ may be a maximum UE transmit power value, and $P_{MAX\_CBR}$ may be a maximum transmit power value based on CBR. If transmit power boosting for the PSCCH is X [dB], X' may be a linear value of X. If transmit power de-boosting for the PSSCH in the first symbol group is Y [dB], Y' may be a linear value of Y. M may be the number of resource blocks in which the PSCCH is transmitted, and N may be the number of resource blocks in which the PSSCH is transmitted. $P_{O\_PSXCH}$ may be determined based on $P_{O\_PSCCH}$ or $P_{O\_PSSCH}$. For example, $P_{O\_PSXCH}$ may be min ($P_{O\_PSCCH}$, $P_{O\_PSSCH}$), max ($P_{O\_PSCCH}$, $P_{O\_PSSCH}$), or average ($P_{O\_PSCCH}$, $P_{O\_PSSCH}$). $\alpha_{PSXCH}$ may be determined based on $\alpha_{PSCCH}$ or $\alpha_{PSSCH}$. For example, $\alpha_{PSXCH}$ may be min ($\alpha_{PSCCH}$, $\alpha_{PSSCH}$), max ($\alpha_{PSCCH}$, $\alpha_{PSSCH}$), or average ($\alpha_{PSCCH}$, $\alpha_{PSSCH}$). $P_{O\_PSCCH}$, $P_{O\_PSSCH}$, $\alpha_{PSCCH}$ and/or $\alpha_{PSSCH}$ may be values pre-defined in the system or (pre-)configured for the UE, and PL may be at least one of the downlink pathloss and the sidelink pathloss. For example, the maximum UE transmit power value may be a value to which maximum power reduction (MPR) according to the implementation of the UE is applied to the configured maximum UE output power. In the case of the UE operating in SL mode 1, $P_{MAX\_CBR}$ may be omitted in the above equation.

Based on the above method, the transmitting UE may determine total transmit power based on the PSCCH and the PSSCH. Accordingly, power required for the PSCCH can be guaranteed. If Y'=1, the transmitting UE may allocate power to all REs for the PSSCH without power loss. In this case, a power gain may occur for the second symbol group. That is, based on the above method, total transmit power may increase unnecessarily.

Accordingly, in order to prevent total transmit power from increasing unnecessarily, Y' may be set to a value less than 1. The Y' value may be set as close as possible to power required for the PSSCH in the second symbol group, and thus power efficiency may be achieved. However, after power allocation for the PSCCH in the first symbol group, damage for EPRE may occur. For example, the Y value may be fixed (in the system). Alternatively, for example, the Y value may be (pre-)configured for the UE. Specifically, for example, the Y value may be independently configured for each resource pool. For example, the Y value may be a single value. Alternatively, for example, the Y value may be a variable value by being related to value(s) of PSCCH allocation and/or PSSCH allocation and/or PSCCH power boosting. For example, if the number of resource blocks allocated for the PSSCH is large, or if power required for the PSSCH is large, a value corresponding to the corresponding Y value may be configured as total transmit power. Conversely, if the number of resource blocks allocated for the PSSCH is small, or if power required for the PSSCH is small, the Y value may have a lower limit value to secure EPRE for the PSSCH to a certain level. For example, Y' may be defined as in Equation 9.

$$Y' = \max\left(\frac{N - X'M}{N - M}, Y'_{min}\right) \quad \text{[Equation 9]}$$

Herein, Y' may be a linear value of Y. M may be the number of resource blocks in which the PSCCH is transmitted, and N may be the number of resource blocks in which the PSSCH is transmitted. $Y'_{min}$ may be a minimum value of Y'. If transmit power boosting for the PSCCH is X [dB], X' may be a linear value of X.

Based on an embodiment of the present disclosure, the transmitting UE may configure total transmit power based on configured power, $P_{CMAX}$, power required for the PSCCH, and/or power required for the PSSCH. For example, the transmitting UE may determine/calculate total transmit power based on Equation 10 or Equation 11. For example, total transmit power may be configured based on a maximum value of power required for each symbol group.

$$P_{SL} = \min(P_{CMAX}, P_{MAX\_CBR}, \max(10 \log_{10}(X'M + Y'_{min} (N-M)) + P_{O\_PSCCH} + \alpha_{PSCCH} \cdot PL, 10 \log_{10}(N) + P_{O\_PSSCH} + \alpha_{PSSCH} \cdot PL)) \quad \text{[Equation 10]}$$

$$P_{SL} = \min(P_{CMAX}, P_{MAX\_CBR}, \max(10 \log_{10}(X'M) + P_{O\_PSCCH} + \alpha_{PSCCH} \cdot PL, 10 \log_{10}(N) + P_{O\_PSSCH} + \alpha_{PSSCH} \cdot PL)) \quad \text{[Equation 11]}$$

Herein, $P_{SL}$ may be a total transmit power value. $P_{CMAX}$ may be a maximum UE transmit power value, and $P_{MAX\_CBR}$ may be a maximum transmit power value based on CBR. If transmit power boosting for the PSCCH is X [dB], X' may be a linear value of X. If transmit power de-boosting for the PSSCH in the first symbol group is Y [dB], Y' may be a linear value of Y. $Y'_{min}$ may be a minimum value of Y'. M may be the number of resource blocks in which the PSCCH is transmitted, and N may be the number of resource blocks in which the PSSCH is transmitted. $P_{O\_PSCCH}$, $P_{O\_PSSCH}$, $\alpha_{PSCCH}$ and/or $\alpha_{PSSCH}$ may be values pre-defined in the system or (pre-)configured for the UE, and PL may be at least one of the downlink pathloss and the sidelink pathloss. For example, the maximum UE transmit power value may be a value to which maximum power reduction (MPR) according to the implementation of the UE is applied to the configured maximum UE output power. In the case of the UE operating in SL mode 1, $P_{MAX\_CBR}$ may be omitted in the above equation.

Referring back to FIG. 14 and FIG. 15, in step S1510, the transmitting UE may allocate total transmit power determined in step S1500 to the PSCCH, the PSSCH and/or the CSI-RS(s). Considering QAM demodulation, the receiving UE needs to know EPRE ratio for the PSSCH between the first symbol group and the second symbol group. In the present disclosure, the ratio of PSSCH EPRE in the first symbol group and PSSCH EPRE in the second symbol group may be referred to as a PSSCH EPRE ratio ($\gamma$). For example, PSSCH EPRE in the second symbol group may be PSSCH EPRE in symbol(s) which does not include CSI-RS(s) in the second symbol group. For example, $\gamma$ may be defined as in Equation 12.

$$\gamma = \frac{PSSCH\ EPRE \text{ in first symbol group}}{PSSCH\ EPRE \text{ in second symbol group}} \quad \text{[Equation 12]}$$

(1) In the Case of the Second Symbol Group

In the case of the second symbol group, for example, in the case of a set of symbols which does not include the PSCCH and includes the PSSCH, the transmitting UE may allocate total transmit power ($P_{SL}$) to the PSSCH, the CSI-RS(s) and/or the PT-RS(s).

Based on an embodiment of the present disclosure, EPRE for the CSI-RS(s) and/or the PT-RS may be configured to be the same as PSSCH EPRE transmitted in the same symbol. In this case, the transmitting UE may allocate a value obtained by dividing a linear value of total transmit power by the total number of allocated subcarriers (i.e., $P_{SL}/(N*M^{RB}_{SC})$, w % here $M^{RB}_{SC}$ is the number of subcarriers per single resource block) to each RE.

For example, if the number of antenna ports used by the transmitting UE for PSSCH transmission and the number of antenna ports used by the transmitting UE for CSI-RS transmission and/or PT-RS transmission are different, the transmitting UE may boost or deboost EPRE for the CSI-RS(s) and/or the PT-RS(s) from the $P_{SL}/(N*M^{RB}_{SC})$ value.

For example, if the number of antenna ports used by the transmitting UE for PSSCH transmission is two and the number of antenna ports used by the transmitting UE for CSI-RS transmission and/or PT-RS transmission is one, the transmitting UE may set/determine/allocate a EPRE value for the CSI-RS(s) and/or the PT-RS(s) by 3 dB higher than the $P_{SL}/(N*M^{RB}_{SC})$ value. In this case, for example, the transmitting UE may set EPRE to zero in the remaining layers except for layer(s) used for PT-RS transmission and/or CSI-RS transmission. For example, if the transmitting UE performs PT-RS transmission and/or CSI-RS transmission on a first RE of a first layer, the transmitting UE may set EPRE of a RE of a second layer related to the first RE to zero. Alternatively, in this case, for example, the transmitting UE may map the PT-RS(s) and/or the CSI-RS(s) to the remaining layers except for layer(s) used for PT-RS transmission and/or CSI-RS transmission, and herein, the transmitting UE may set EPRE for the PT-RS(s) and/or the CSI-RS(s) to zero. For example, if the transmitting UE performs PT-RS transmission and/or CSI-RS transmission on a first RE of a first layer, the transmitting UE may map the PT-RS(s) and/or CSI-RS(s) on a RE of a second layer related to the first RE, and herein the transmitting UE may set EPRE for the PT-RS(s) and/or CSI-RS(s) to zero. Alternatively, in this case, for example, the transmitting UE may not perform PSSCH transmission in the remaining layers except for layer(s) used for PT-RS transmission and/or CSI-RS transmission. For example, if the transmitting UE performs PT-RS transmission and/or CSI-RS transmission on a first RE of a first layer, the transmitting UE may not perform PSSCH transmission on a RE of a second layer related to the first RE. That is, for example, if the transmitting UE performs PT-RS transmission and/or CSI-RS transmission on a first RE of a first layer, and if the transmitting UE performs PSSCH transmission on the first layer and a second layer, the transmitting UE may not perform PSSCH transmission on a RE of the second layer corresponding to the first RE.

For example, if the number of antenna ports used by the transmitting UE for PSSCH transmission is one and the number of antenna ports used by the transmitting UE for CSI-RS transmission and/or PT-RS transmission is two, the transmitting UE may set/determine/allocate a EPRE value for the CSI-RS(s) and/or the PT-RS(s) by 3 dB lower than the $P_{SL}/(N*M^{RB}_{SC})$ value.

Alternatively, based on an embodiment of the present disclosure, EPRE for the CSI-RS(s) may be configured to be different from PSSCH EPRE transmitted in the same symbol. For example, EPRE for the CSI-RS(s) may be (pre-)configured for the UE. In this case, the transmitting UE may allocate power ($P_{CSI-RS}$) based on a EPRE value configured for the CSI-RS(s). For example, if EPRE for the CSI-RS(s) is indicated/configured as B [dB], the transmitting UE may allocate power B+10 $\log_{10}$(L) to the CSI-RS(s). In addition, the transmitting UE may allocate power ($P_{PSSCH}$) to the PSSCH based on a specific EPRE. In this case, in order to utilize the PSSCH EPRE ratio, the UE may apply PSSCH EPRE for the first symbol group. In addition, in order to allocate total transmit power, the transmitting UE may distribute $P'_{SL} - P'_{CSI-RS} - P'_{PSSCH}$ to specific RE(s). $P'_{SL}$ may be a linear value of $P_{SL}$ [dB], $P'_{CSI-RS}$ may be a linear value of $P_{CSI-RS}$ [dB], and $P'_{PSSCH}$ may be a linear value of $P_{PSSCH}$ [dB].

Based on an embodiment of the present disclosure, with respect to channel(s)/signal(s) corresponding to a plurality of APs, power may be evenly distributed to each AP. For example, 2 APs may be possible at least in the case of PSSCH/CSI-RS. If power P is allocated to 2 APs, power P'/2 may be allocated to each AP.

If the PSCCH and the PSSCH are not FDMed, the proposed power allocation method for the PSSCH may also be applied to the power allocation for the PSCCH. That is, the transmitting UE may allocate a value obtained by dividing a linear value of total transmit power by the total number of allocated subcarriers (i.e., $P_{SL}/(N*M^{RB}_{SC})$, where $M^{RB}_{SC}$ is the number of subcarriers per single resource block) to each RE.

(2) In the Case of the First Symbol Group

In the case of the first symbol group, for example, in the case of a set of symbols in which the PSCCH and the PSSCH are FDMed, the transmitting UE may allocate total transmit power ($P_{SL}$) to the PSCCH, the PSSCH, the CSI-RS(s) and/or the PT-RS(s).

1) In the Case of Preferentially Allocating Power for the PSSCH

Based on an embodiment of the present disclosure, the transmitting UE may preferentially allocate power to the PSSCH based on a specific EPRE. In addition, the transmitting UE may allocate the remaining power to the PSCCH. For a specific γ value, each PSSCH EPRE may be defined as in Equation 13.

$$PSSCH\ EPRE = \frac{\gamma P'_{SL}}{NM^{RB}_{SC}} \qquad \text{[Equation 13]}$$

Herein, $P'_{SL}$ may be a linear value of total transmit power, N may be the number of resource blocks in which the PSSCH is transmitted, $M^{RB}_{SC}$ may be the number of subcarriers per single resource block, and γ may be a ratio of PSSCH EPRE in the first symbol group to PSSCH EPRE in the second symbol group.

For example, the γ may be (pre-)configured for the UE (for each resource pool). Alternatively, for example, γ may be a variable value by being related to value(s) of PSCCH allocation and/or PSSCH allocation and/or PSCCH power boosting. For example, if the transmitting UE does not perform power boosting for the PSCCH, γ=1.

2) In the Case of Preferentially Allocating Power for the PSCCH

Based on an embodiment of the present disclosure, the transmitting UE may preferentially allocate power to the PSCCH based on a specific EPRE. In addition, the transmitting UE may allocate the remaining power to the PSSCH.

For example, an EPRE configuration for the PSCCH may be boosted by Z [dB] compared to PSSCH EPRE in the second symbol group. Z may be pre-defined (in the system). For example, Z may be 3 [dB]. Alternatively, Z may be (pre-)configured for the UE. For example, EPRE for the PSCCH may be defined as in Equation 14.

$$PSCCH\ EPRE = \frac{Z'P'_{SL}}{NM^{RB}_{SC}} \qquad \text{[Equation 14]}$$

Herein, $P'_{SL}$ may be a linear value of total transmit power, N may be the number of resource blocks in which the PSSCH is transmitted, $M^{RB}_{SC}$ may be the number of subcarriers per single resource block, and Z' may be a linear value of Z [dB]. In this case, γ may be defined as in Equation 15.

$$\gamma = \frac{N - Z'M}{N - M} \qquad \text{[Equation 15]}$$

Herein, Z' may be a linear value of Z [dB], M may be the number of resource blocks in which the PSCCH is transmitted, and N may be the number of resource blocks in which the PSSCH is transmitted. Accordingly, the receiving UE may perform QAM demodulation based on the corresponding PSSCH EPRE ratio value. In this case, if power is limited, for example, if $P_{CMAX}$ is allocated, PSCCH power boosting may not be possible, and power allocation for the PSSCH in the first symbol group may be impossible or inefficient. That is, in a situation where Z'M/N≤1 is satisfied, the transmitting UE may perform PSCCH power boosting based on the configured Z value. Otherwise, the transmitting UE may not perform PSCCH power boosting.

Alternatively, for example, an EPRE configuration for the PSCCH may be boosted by Z [dB] compared to PSSCH EPRE in the first symbol group. Z may be pre-defined (in the system). For example, Z may be 3 [dB]. Alternatively, Z may be (pre-)configured for the UE. For example, EPRE for the PSCCH may be defined as in Equation 16.

$$PSCCH\ EPRE = \frac{Z'\gamma P'_{SL}}{NM^{RB}_{SC}} \qquad \text{[Equation 16]}$$

Herein, $P'_{SL}$ may be a linear value of total transmit power, N may be the number of resource blocks in which the PSSCH is transmitted, $M^{RB}_{SC}$ may be the number of subcarriers per single resource block, and Z' may be a linear value of Z [dB]. In this case, γ may be defined as in Equation 17.

$$\gamma = \frac{N}{Z'M + N - M} \quad \text{[Equation 17]}$$

Herein, Z' may be a linear value of Z [dB], M may be the number of resource blocks in which the PSCCH is transmitted, and N may be the number of resource blocks in which the PSSCH is transmitted. Accordingly, the receiving UE may perform QAM demodulation based on the corresponding PSSCH EPRE ratio value.

Alternatively, for example, the transmitting UE may calculate an average value based on the number of symbols included in the first symbol group, the number of symbols included in the second symbol group, and PSSCH EPRE for each symbol group, and the transmitting UE may determine PSCCH EPRE based on the average value.

Alternatively, for example, the transmitting UE may calculate/configure power for the PSCCH and preferentially allocate the power for the PSCCH based on the corresponding value. For example, the power for the PSCCH may be obtained based on Equation 18.

$$P_{PSCCH} = \min\left(\frac{X'M}{X'M + Y'(N-M)} P_{CMAX}, \right. \quad \text{[Equation 18]}$$
$$\left. 10\log_{10}(X'M) + P_{O\_PSCCH} + \alpha_{PSCCH} \cdot PL\right)$$

For example, the power for the PSCCH may be obtained based on Equation 19.

$$P_{PSCCH} = \min\left(10\log_{10}\left(\frac{X'M}{X'M + Y'(N-M)}\right) + P_{CMAX}, \right. \quad \text{[Equation 19]}$$
$$10\log_{10}\left(\frac{X'M}{X'M + Y'(N-M)}\right) + P_{MAX\_CBR},$$
$$\left. 10\log_{10}(2^u X'M) + P_{O\_PSCCH} + \alpha_{PSCCH} \cdot PL\right)$$

For example, the were for the PSCCH may be obtained based on Equation 20.

$$P_{PSCCH} = \quad \text{[Equation 20]}$$
$$\min\left(10\log_{10}\left(\frac{M}{N}\right) + P_{CMAX}, 10\log_{10}\left(\frac{M}{N}\right) + P_{MAX\_CBR}, \right.$$
$$\left. 10\log_{10}(2^u X'M) + P_{O\_PSCCH} + \alpha_{PSCCH} \cdot PL\right)$$

For example, the power for the PSCCH may be obtained based on Equation 21.

$$P_{PSCCH} = \quad \text{[Equation 21]}$$
$$10\log_{10}\left(\frac{X'M}{X'M + Y'(N-M)}\right) + \min(P_{CMAX}, P_{MAX\_CBR},$$
$$10\log_{10}(2^u X'M + 2^u Y'(N-M)) + P_{O\_PSCCH} + \alpha_{PSCCH} \cdot PL)$$

For example, the power for the PSCCH may be obtained based on Equation 22.

$$P_{PSCCH} = 10\log_{10}\left(\frac{M}{N}\right) + \min(P_{CMAX}, P_{MAX\_CBR}, \quad \text{[Equation 22]}$$
$$10\log_{10}(2^u N) + P_{O\_PSCCH} + \alpha_{PSCCH} \cdot PL)$$

For example, the power for the PSCCH may be obtained based on Equation 23.

$$P_{PSCCH} = 10\log_{10}\left(\frac{M}{N}\right) + P_{PSSCH} \quad \text{[Equation 23]}$$

Herein, $P_{CMAX}$ may be a maximum UE transmit power value. If transmit power boosting for the PSCCH in the first symbol group is X [dB], X' may be a linear value of X. If transmit power de-boosting for the PSSCH in the first symbol group is Y [dB], Y' may be a linear value of Y. M may be the number of resource blocks in which the PSCCH is transmitted, and N may be the number of resource blocks in which the PSSCH is transmitted. $P_{O\_PSCCH}$ and/or $\alpha_{PSCCH}$ may be values pre-defined in the system or (pre-)configured for the UE, and PL may be at least one of the downlink pathloss and the sidelink pathloss. For example, the maximum UE transmit power value may be a value to which maximum power reduction (MPR) according to the implementation of the UE is applied to the configured maximum UE output power. In this case, γ may be defined as in Equation 24.

$$\gamma = \frac{N(P'_{SL} - P'_{PSCCH})}{(N-M)P'_{SL}} \quad \text{[Equation 24]}$$

Accordingly, the receiving UE may perform QAM demodulation based on the corresponding PSSCH EPRE ratio value.

For example, referring to Equation 23, the UE may determine a power value (i.e., $P_{PSSCH}$) for PSSCH transmission in the second symbol period. In addition, the UE may determine a power value (i.e., $P_{PSCCH}$) for PSCCH transmission in the first symbol period by adding a value 10 log (M/N) to the power value for PSSCH transmission.

Meanwhile, the UE may set/determine/obtain a transmit power value for PSFCH transmission. For example, the UE may perform sequence-based SFCI transmission in 1 PRB in consideration of the PSFCH transmission scheme. In this case, for example, the UE may set/determine/obtain a transmit power value for PSFCH transmission based on Equation 25.

$$P_{PSFCN,b,f,c} = \min\{P_{CMAX,f,c}(i), P_{MAC\_CBR,b,f,c}, 10 \log_{10}$$
$$(2^u) + P_{O,PSFCH,b,f,c}(0) + \alpha_{b,f,c}(3)PL_{b,f,c}(0) +$$
$$\Delta_{F\_PSFCH}(F) + \Delta_{TF,b,f,c}\} \quad \text{[Equation 25]}$$

Herein, $P_{O,PSFCH,b,f,c}(0)$ and $\alpha_{b,f,c}$ may be values configured for the UE independently of the PSCCH/PSSCH. For example, $P_{O,PSFCH,b,f,c}(0)$ and $\alpha_{b,f,c}$ may be configured for each resource pool. For example, $\Delta_{F\_PSFCH(F)}$ may be configured for each resource pool. Additionally/alternatively, for example, $\Delta_{F\_PSFCH}$ (F) may be configured for each resource set. Additionally/alternatively, for example, $\Delta_{F\_PSFCH}$ (F) may be configured for each PSFCH format. For example, $\Delta_{TF,b,f,c}$ may be obtained based on the length of symbols used by the UE for PSFCH transmission and/or the size of the SFCI. For example, $\Delta_{TF,b,f,c}$ may be obtained based on Equation 26. For example, as the length of symbols used by the UE for PSFCH transmission increases, the UE may de-boost/reduce transmit power for PSFCH transmission. For example, as the size of the SFCI transmitted by the UE increases, the UE may boost/increase transmit power for PSFCH transmission. For example, $\Delta_{SFCI}=0$. For example, $N^{PSFCH}_{ref}$ may be fixed to a specific value. For example, $N^{PSFCH}_{ref}$ may be set to a value 1 or 2 except for an AGC symbol. For example, $N^{PSFCH}_{ref}$ may be set to a value 2 or 3 including an AGC symbol. For example, $N^{PSFCH}_{ref}$ may be configured for each resource pool and/or PSFCH format. For example, $N^{PSFCH}_{symb}$ may be the number of symbols used by the UE for PSFCH transmission. For example, $N^{PSFCH}_{symb}$ may be the number of symbols for PSFCH transmission excluding a symbol for which AGC is performed (i.e., an AGC symbol).

$$\Delta_{TF,b,f,c} = 10\log_{10}\left(\frac{N^{PSFCH}_{ref}}{N^{PSFCH}_{symb}(i)}\right) + \Delta_{SFCI} \quad \text{[Equation 26]}$$

Based on an embodiment of the present disclosure, with respect to channel(s)/signal(s) corresponding to a plurality of APs, power may be evenly distributed to each AP. For example, 2 APs may be possible at least in the case of PSSCH/CSI-RS. If power P is allocated to 2 APs, power P'/2 may be allocated to each AP.

Referring back to FIG. 14 and FIG. 15, in step S1520, the transmitting UE may transmit the PSCCH, the PSSCH, the PT-RS(s) and/or the CSI-RS(s) to the receiving UE. For example, the transmitting UE may transmit the PSCCH, the PSSCH, the PT-RS(s) and/or the CSI-RS(s) based on transmit power allocated to each channel.

Based on an embodiment of the present disclosure, the transmitting UE can efficiently control SL transmit power. Therefore, for example, the receiving UE can efficiently perform QAM demodulation.

Based on an embodiment of the present disclosure, if a UE receiving a PSCCH and/or a PSSCH (hereinafter, PSCCH/PSSCH receiving UE) transmits N PSFCHs in the same time resource (e.g., a slot, a symbol, etc.) to a PSCCH/PSSCH transmitting UE, the PSCCH/PSSCH receiving UE may determine/derive/calculate transmit power for each PSFCH. In this case, for example, the N value may be the number of PSFCHs actually transmitted or the (configured) maximum number of transmitted PSFCHs. For example, the N value may be a natural number. For example, the PSCCH/PSSCH receiving UE may determine/derive/calculate transmit power for each PSFCH, based on a value obtained by dividing a linear value of the maximum UE transmit power and a configured maximum power per CBR by the N value, respectively. In this case, for example, required power for PSFCH may be determined/derived/calculated based on N=1. Alternatively, for example, after the PSCCH/PSSCH receiving UE calculates total power of N PSFCH transmissions, the PSCCH/PSSCH receiving UE may determine/derive/calculate transmit power for each PSFCH based on a value obtained by dividing total transmit power value for the N PSFCH transmissions by the N value. Alternatively, for example, after the PSCCH/PSSCH receiving UE calculates transmit power for each of N PSFCHs, the PSCCH/PSSCH receiving UE may determine/derive/calculate transmit power for each PSFCH based on the adjusted sum of transmit powers for the N PSFCHs so that the total transmit power does not exceed the maximum UE transmit power and/or the maximum power value configured for each CBR.

Based on an embodiment of the present disclosure, if the PSCCH/PSSCH receiving UE transmits N PSFCHs to the PSCCH/PSSCH transmitting UE in an active sidelink BWP b configured on a carrier f of a serving cell c, the PSCCH/PSSCH receiving UE may determine/derive/calculate transmit power $P_{PSFCH,b,f,c}$ (i) value for each PSFCH at the PSSCH transmission occasion i. In this case, for example, the N value may be the number of PSFCHs actually transmitted or the (configured) maximum number of transmitted PSFCHs. For example, the $P_{PSFCH,b,f,c}$ (i) value may be expressed in units of dBm.

For example, the $P_{PSFCH,b,f,c}$ (i) value may be determined/derived/calculated based on Equation 27.

$$P_{PSFCH,b,f,c}(i)=\min\{P_{CMAX,f,c}(i)-10\log_{10}(N),$$
$$P_{MAC\_CBR,b,f,c}-10\log_{10}(N),10\log_{10}(2^u)+$$
$$P_{O,PSFCH,b,f,c}(0)+\alpha_{b,f,c}(3)PL_{b,f,c}(0)+\Delta_{F\_PSFCH}$$
$$(F)+\Delta_{TF,b,f,c}\} \quad \text{[Equation 27]}$$

For example, the $P_{PSFCH,b,f,c}$ (i) value may be determined/derived/calculated based on Equation 28.

$$P_{PSFCH,b,f,c}(i)=\min\{P_{CMAX,f,c}(i)-10\log_{10}(N),$$
$$P_{MAC\_CBR,b,f,c},10\log_{10}(2^u)+P_{O,PSFCH,b,f,c}(0)+$$
$$\alpha_{b,f,c}(3)PL_{b,f,c}(0)+\Delta_{F\_PSFCH}(F)+\Delta_{TF,b,f,c}\} \quad \text{[Equation 28]}$$

For example, the $P_{PSFCH,b,f,c}$ (i) value may be determined/derived/calculated based on Equation 29.

$$P_{PSFCH,b,f,c}(i)=\min\{P_{CMAX,f,c}(i),P_{MAC\_CBR,b,f,c},10$$
$$\log_{10}(2^u N)+P_{O,PSFCH,b,f,c}(0)+\alpha_{b,f,c}(3)PL_{b,f,c}(0)+$$
$$\Delta_{F\_PSFCH}(F)+\Delta_{TF,b,f,c}\}-10\log_{10}(N) \quad \text{[Equation 29]}$$

For example, the $P_{PSFCH,b,f,c}$ (i) value may be determined/derived/calculated based on Equations 30 to 33.

$$\tilde{P}_{PSFCH,b,f,c}(i)=\min\{P_{CMAX,f,c}(i),P_{MAC\_CBR,b,f,c},10$$
$$\log_{10}(2^u)+P_{O,PSFCH,b,f,c}(0)+\alpha_{b,f,c}(3)PL_{b,f,c}(0)+$$
$$\Delta_{F\_PSFCH}(F)+\Delta_{TF,b,f,c}\} \quad \text{[Equation 30]}$$

Herein, if $\delta$ is determined to satisfy Equation 31 or Equation 32, the $P_{PSFCH,b,f,c}$ (i) value may be determined/derived/calculated based on Equation 33.

$$\Sigma \delta P_{PSFCH,b,f,c}(i) \leq \min\{P_{CMAX,f,c}(i),P_{MAC\_CBR,b,f,c}\} \quad \text{[Equation 31]}$$

$$\Sigma \delta \tilde{P}_{PSFCH,b,f,c}(i) \leq P_{CMAX,f,c}(i) \quad \text{[Equation 32]}$$

$$P_{PSFCH,b,f,c}(i)=\delta \tilde{P}_{PSFCH,b,f,c}(i) \quad \text{[Equation 33]}$$

For example, in Equations 27 to 33, $P_{CMAX,f,c}(i)$ may be defined as the maximum output power configured for the UE (e.g., UE configured maximum output power) at the PSSCH transmission occasion i.

For example, in Equations 27 to 33, $P_{MAC\_CBR,b,f,c}$ may be defined as the maximum transmit power value (maxTxpower value) for an active sidelink BWP b configured on a carrier f of a serving cell c, which is configured based on a priority level of a PSSCH and a CBR range.

For example, in Equations 27 to 33, $PL_{b,f,c}(0)$ may be defined as an estimated downlink pathloss value for an active downlink BWP configured on a carrier f of a serving cell c. In this case, the $PL_{b,f,c}(0)$ may be expressed in units of dB.

For example, the PSCCH/PSSCH receiving UE may receive/obtain/determine $P_{O,PSFCH,b,f,c}$ (0) and $\alpha_{b,f,c}$ (3) values of Equations 27 to 33 from a base station or a network through upper layer (e.g., RRC layer) parameter(s) for an active sidelink BWP b configured on a carrier f of a serving cell c.

For example, the PSCCH/PSSCH receiving UE may receive/obtain/determine the $\Delta_{F\_PSFCH}$ (F) value of Equations 27 to 33 from a base station or a network based on deltaF-PSFCH-f0 for sequence-based PSFCH format. Alternatively, for example, if the PSCCH/PSSCH receiving UE does not receive deltaF-PSFCH-f0 for sequence-based PSFCH format, $\Delta_{F\_PSFCH}$ (F) value may be determined to be 0.

For example, the $\Delta_{TF,b,f,c}$ values may be determined based on Equation 34.

$$\Delta_{TF,b,f,c} = 10\log_{10}\left(\frac{N_{ref}^{PSFCH}}{N_{symb}^{PSFCH}(i)}\right) + \Delta_{SFCI} \quad \text{[Equation 34]}$$

Herein, for example, $N^{PSFCH}{}_{symb}$ (i) may be the number of symbols used by the UE for PSFCH transmission. For example, $N^{PSFCH}{}_{symb}$ (i) may be defined as the number of PSFCH transmission symbols excluding a symbol for which automatic gain control (AGC) is performed (i.e., an AGC symbol), $N^{PSFCH}{}_{ref}$ may be 1, and $\Delta_{SFCI}$ may be 0.

Based on various embodiments of the present disclosure, the UE may efficiently determine power for PSCCH transmission, power for PSSCH transmission, and/or power for PSFCH transmission. For example, after the UE determines power for PSSCH transmission in the second symbol period, the UE may determine power for PSCCH transmission and power for PSSCH transmission in the first symbol period based on the power for the PSSCH transmission.

Figure 16:
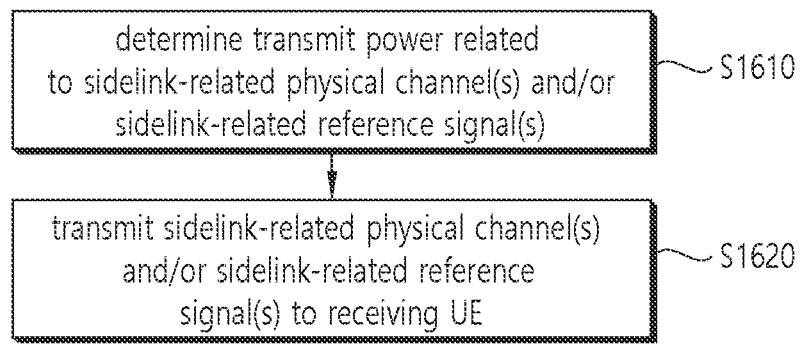
FIG. 16 shows a method for a transmitting UE to perform power control, based on an embodiment of the present disclosure.

FIG. 16 shows a method for a transmitting UE to perform power control, based on an embodiment of the present disclosure. The embodiment of FIG. 16 may be combined with various embodiments of the present disclosure.

Referring to FIG. 16, in step S1610, the transmitting UE may determine transmit power related to sidelink-related physical channel(s) and/or sidelink-related reference signal(s). In step S1620, the transmitting UE may transmit sidelink-related physical channel(s) and/or sidelink-related reference signal(s) to a receiving UE. For example, the sidelink-related physical channel(s) may include at least one of a PSCCH, a PSSCH, and/or a PSFCH. For example, sidelink-related reference signal(s) may include at least one of PT-RS(s) and CSI-RS(s).

Figure 17:
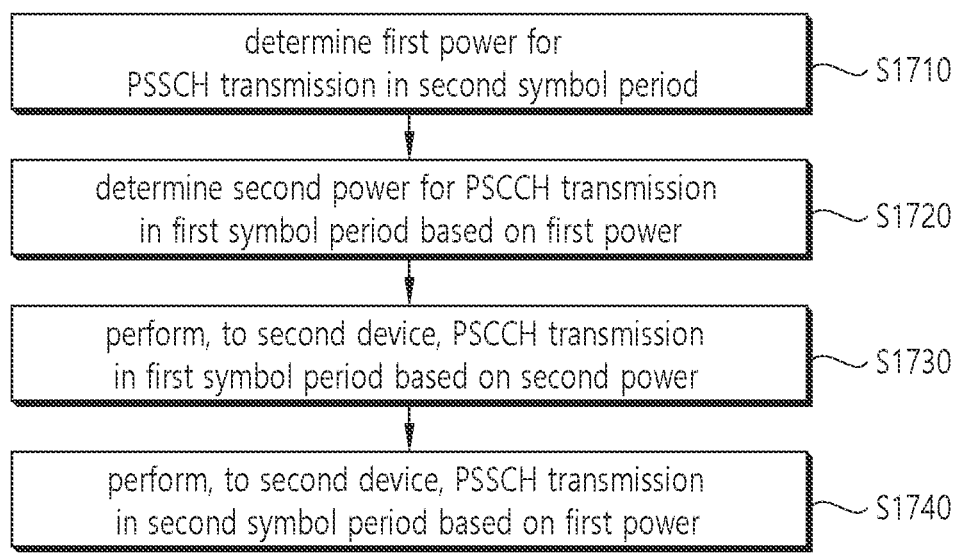
FIG. 17 shows a method for a first device to perform wireless communication, based on an embodiment of the present disclosure.

FIG. 17 shows a method for a first device to perform wireless communication, based on an embodiment of the present disclosure. The embodiment of FIG. 17 may be combined with various embodiments of the present disclosure.

Referring to FIG. 17, in step S1710, the first device may determine a first power for physical sidelink shared channel (PSSCH) transmission in a second symbol period.

For example, the first power may be determined based on a pathloss and a number of resource blocks (RBs) for the PSSCH transmission in the second symbol period. For example, the pathloss may include at least one of a pathloss between the first device and the second device or a pathloss between the first device and a base station.

For example, the first power may be determined based on a subcarrier spacing, a pathloss, and a number of resource blocks (RBs) for the PSSCH transmission in the second symbol period. For example, the pathloss may include at least one of a pathloss between the first device and the second device or a pathloss between the first device and a base station.

For example, the first power may be determined as a smallest value among a maximum transmit power configured for the first device, a channel busy ratio (CBR)-based maximum transmit power, and a third power.

For example, the third power may be determined based on a following equation.

$$\text{third power} = 10\log_{10}(2^u N) + P_O + \alpha \cdot PL$$

Herein, u may be subcarrier spacing, N may be a number of resource blocks (RBs) for the PSSCH transmission in the second symbol period, $P_O$ may be a value configured for the first device, and $\alpha$ may be a value configured for the first device, and PL may be a pathloss between the first device and the second device or a pathloss between the first device and a base station.

In step S1720, the first device may determine a second power for physical sidelink control channel (PSCCH) transmission in a first symbol period based on the first power.

For example, the second power may be determined based on the first power, a number of resource blocks (RBs) for the PSCCH transmission in the first symbol period, and a number of RBs in the first symbol period. For example, the number of RBs in the first symbol period may be a sum of the number of RBs for the PSCCH transmission in the first symbol period and a number of RBs for the PSSCH transmission in the first symbol period. For example, the number of RBs in the first symbol period may be the number of RBs allocated for SL communication in the first symbol period.

For example, the second power may be determined based on a following equation.

$$\text{second power} = 10\log_{10}\left(\frac{M}{N}\right) + \text{first power}$$

Herein, the first power may be power for the PSSCH transmission in the second symbol period, M may be a number of resource blocks (RBs) for the PSCCH transmission in the first symbol period, and N may be a number of RBs in the first symbol period.

In step S1730, the first device may perform, to a second device, the PSCCH transmission in the first symbol period based on the second power.

In step S1740, the first device may perform, to the second device, the PSSCH transmission in the second symbol period based on the first power. Herein, the second symbol period may include resources for the PSSCH transmission, and the first symbol period may include resources for the PSCCH transmission and the PSSCH transmission. Herein, the second symbol period may not include a resource for the PSCCH transmission.

Additionally, for example, the first device may transmit, to the second device, a reference signal. For example, transmit power of the reference signal may be determined based on a number of antenna ports used for transmission of the reference signal. For example, the reference signal may include at least one of channel state information (CSI)-reference signal (RS) or phase tracking (PT)-reference signal (RS). For example, transmit power of the reference signal transmitted through one antenna port may be 3 dB greater than transmit power of the reference signal transmitted through two antenna ports.

The proposed method can be applied to device(s) described below. First, the processor 102 of the first device 100 may determine a first power for physical sidelink shared channel (PSSCH) transmission in a second symbol period. In addition, the processor 102 of the first device 100 may determine a second power for physical sidelink control channel (PSCCH) transmission in a first symbol period based on the first power. In addition, the processor 102 of the first device 100 may control the transceiver 106 to perform, to a second device, the PSCCH transmission in the first symbol period based on the second power. In addition, the processor 102 of the first device 100 may control the transceiver 106 to perform, to the second device, the PSSCH transmission in the second symbol period based on the first power.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: determine a first power for physical sidelink shared channel (PSSCH) transmission in a second symbol period; determine a second power for physical sidelink control channel (PSCCH) transmission in a first symbol period based on the first power; perform, to a second device, the PSCCH transmission in the first symbol period based on the second power; and perform, to the second device, the PSSCH transmission in the second symbol period based on the first power. Herein, the second symbol period may include resources for the PSSCH transmission, and the first symbol period may include resources for the PSCCH transmission and the PSSCH transmission. Herein, the second symbol period may not include a resource for the PSCCH transmission.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: determine a first power for physical sidelink shared channel (PSSCH) transmission in a second symbol period; determine a second power for physical sidelink control channel (PSCCH) transmission in a first symbol period based on the first power; perform, to a second UE, the PSCCH transmission in the first symbol period based on the second power; and perform, to the second UE, the PSSCH transmission in the second symbol period based on the first power. Herein, the second symbol period may include resources for the PSSCH transmission, and the first symbol period may include resources for the PSCCH transmission and the PSSCH transmission.

Based on an embodiment of the present disclosure, a non-transitory computer-readable storage medium storing instructions may be provided. For example, the instructions, when executed, may cause a first device to: determine a first power for physical sidelink shared channel (PSSCH) transmission in a second symbol period; determine a second power for physical sidelink control channel (PSCCH) transmission in a first symbol period based on the first power; perform, to a second device, the PSCCH transmission in the first symbol period based on the second power; and perform, to the second device, the PSSCH transmission in the second symbol period based on the first power. Herein, the second symbol period may include resources for the PSSCH transmission, and the first symbol period may include resources for the PSCCH transmission and the PSSCH transmission.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
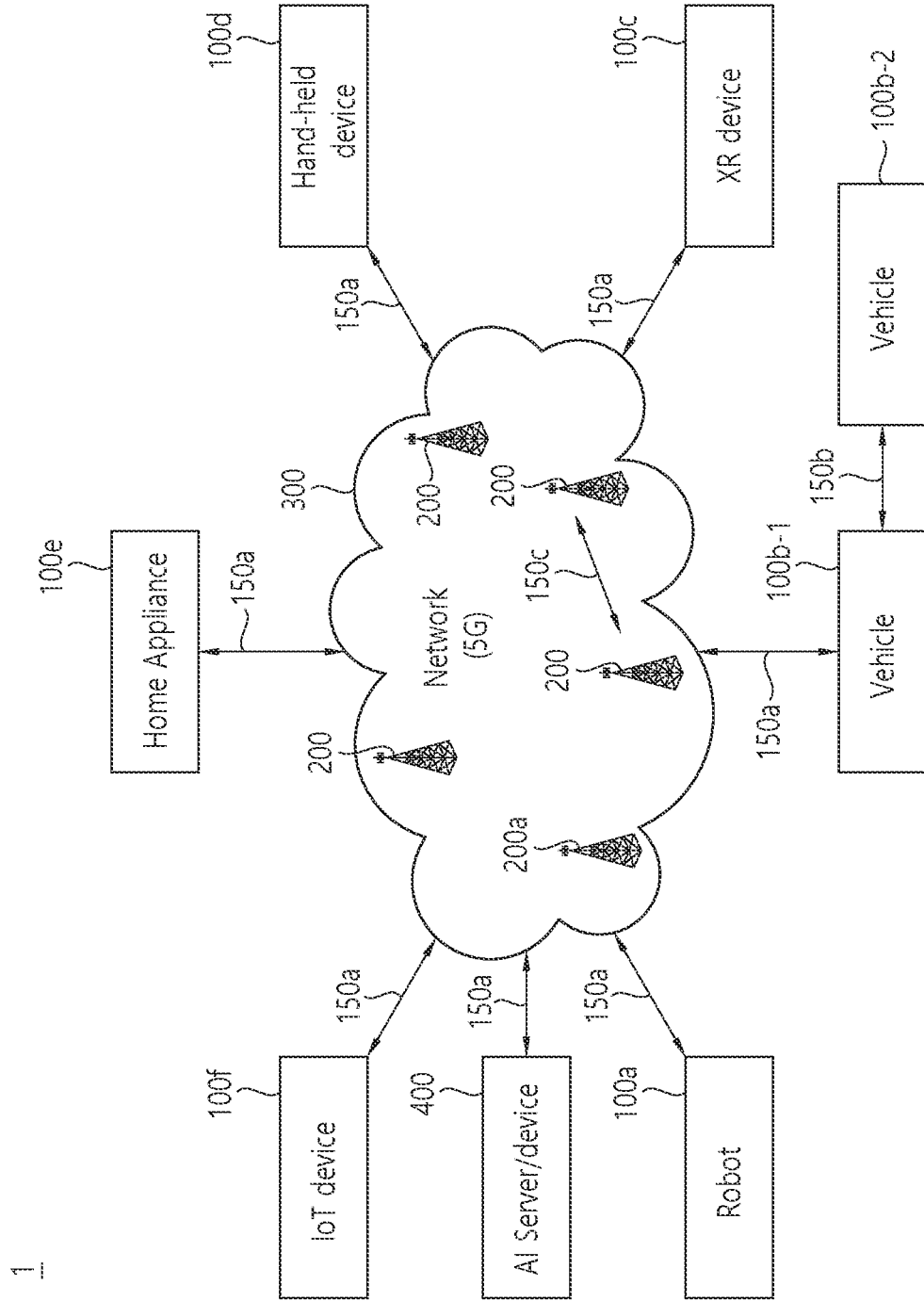
FIG. 18 shows a communication system 1, based on an embodiment of the present disclosure.

FIG. 18 shows a communication system 1, based on an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
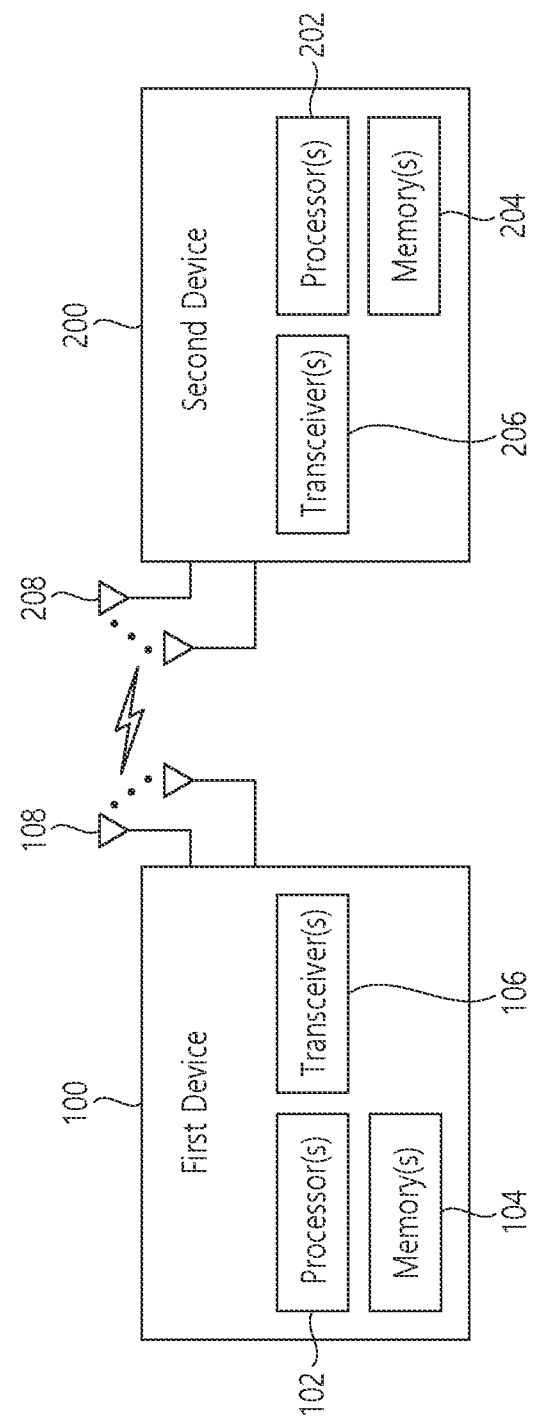
FIG. 19 shows wireless devices, based on an embodiment of the present disclosure.

FIG. 19 shows wireless devices, based on an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200) and/or (the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs. SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
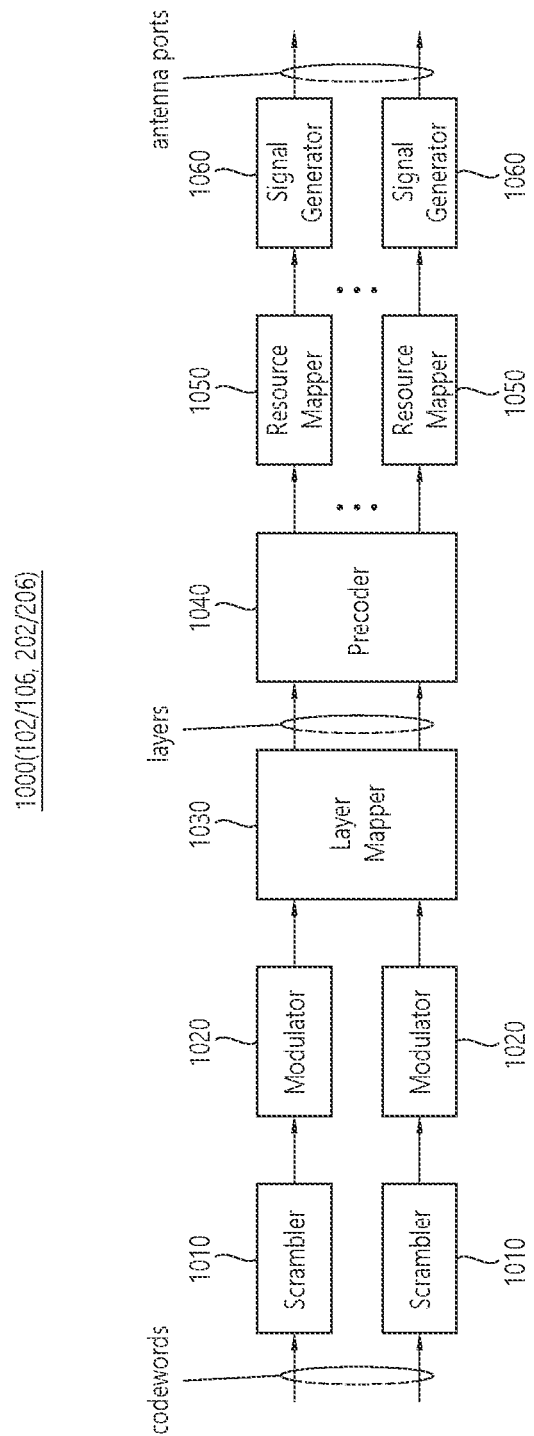
FIG. 20 shows a signal process circuit for a transmission signal, based on an embodiment of the present disclosure.

FIG. 20 shows a signal process circuit for a transmission signal, based on an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters. Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder demodulators, descramblers, and decoders.

Figure 21:
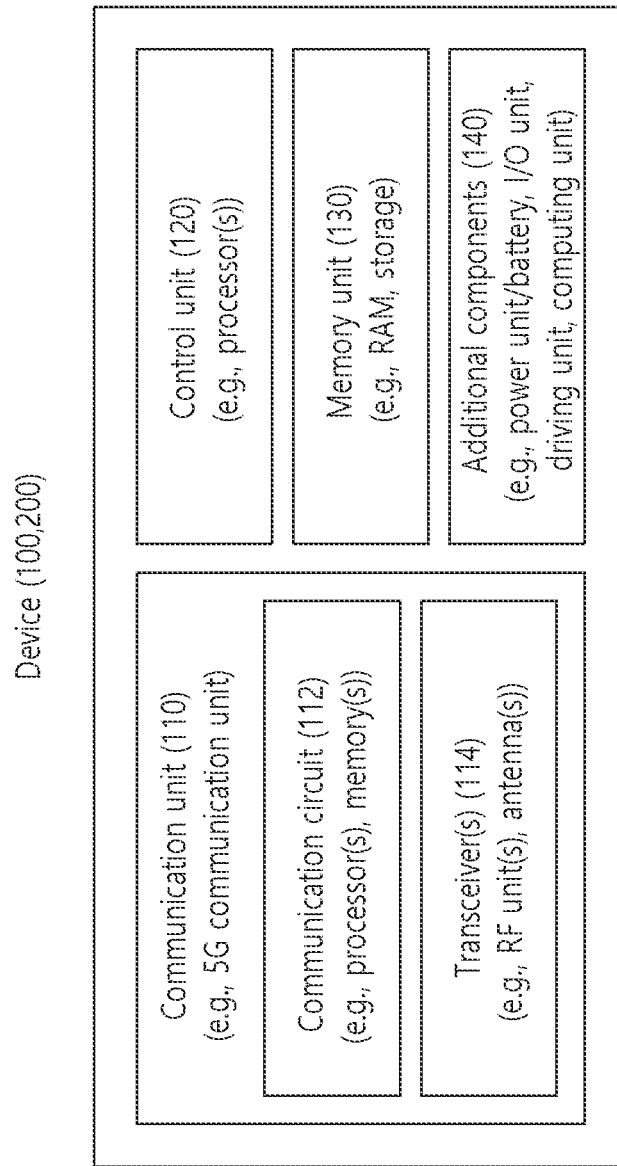
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
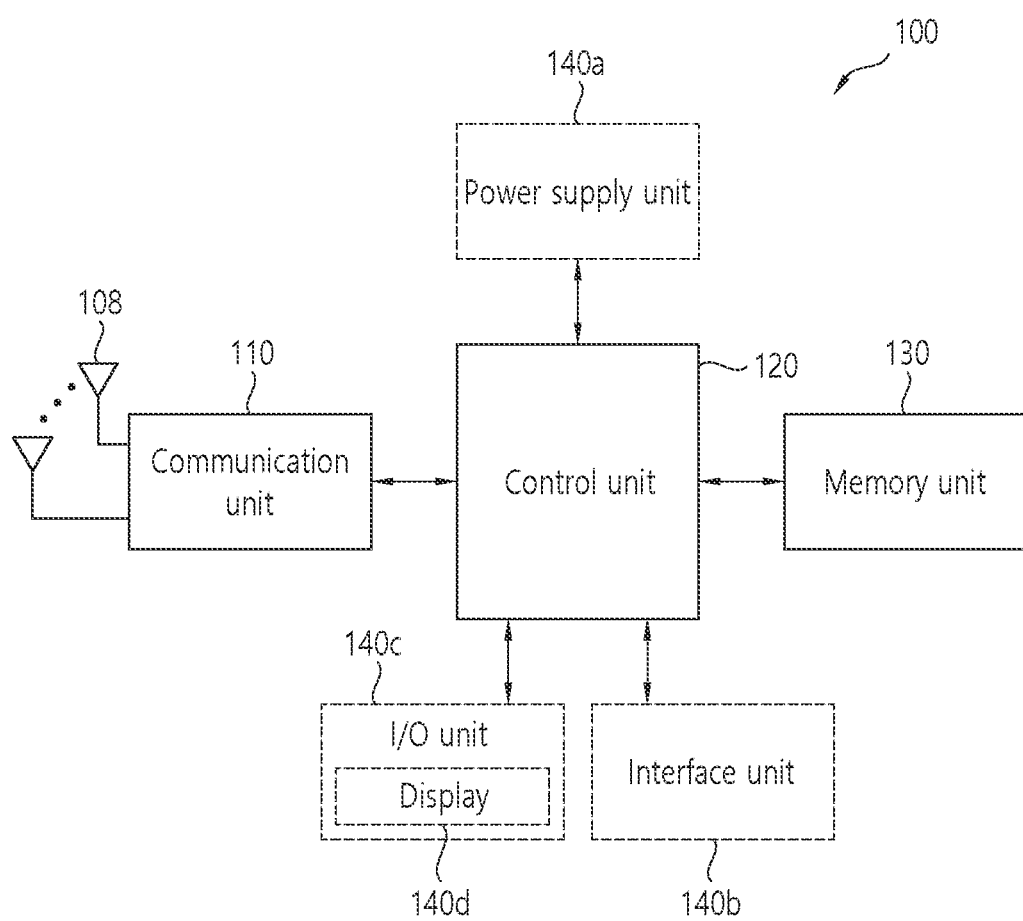
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
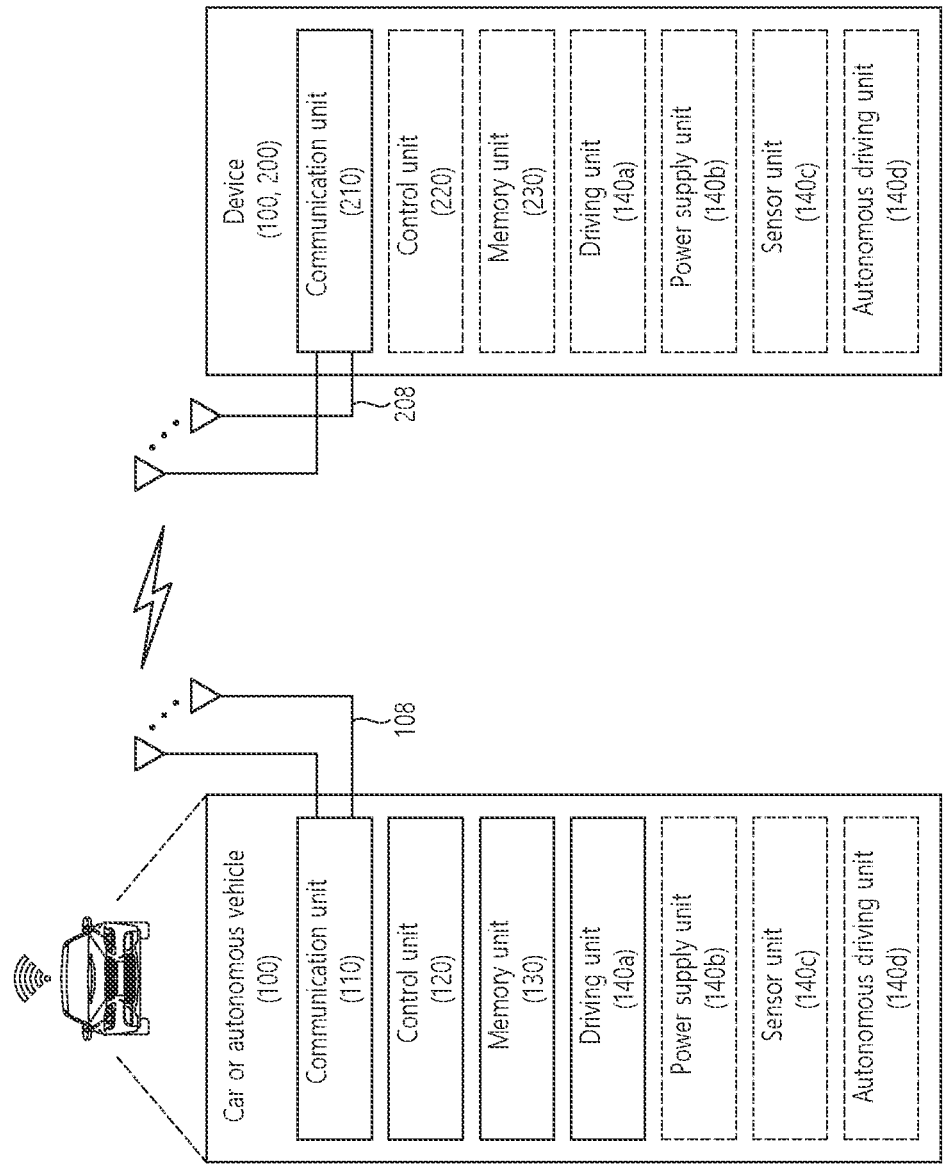
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    determining a first power for physical sidelink shared channel (PSSCH) transmission in symbols in which a physical sidelink control channel (PSCCH) related to the PSSCH transmission is not transmitted in PSCCH-PSSCH transmission occasion;
    after the determination of the first power, determining a second power for PSCCH transmission in symbols in which the PSCCH related to the PSSCH transmission is transmitted in the PSCCH-PSSCH transmission occasion as:

$$\text{second power} = 10\log_{10}\left(\frac{M}{N}\right) + \text{first power}$$

wherein the M is a number of resource blocks for the PSCCH transmission in the PSCCH-PSSCH transmission occasion, and the N is a number of resource blocks for the PSCCH-PSSCH transmission occasion;
    performing, to a second device, the PSCCH transmission based on the second power; and
    performing, to the second device, the PSSCH transmission based on the first power.

2. The method of claim 1, wherein the symbols in which the PSCCH related to the PSSCH transmission is not transmitted and the symbols in which the PSCCH related to the PSSCH transmission is transmitted are in the PSCCH-PSSCH transmission occasion.

3. The method of claim 1, wherein the first power is determined based on a pathloss and the number of resource blocks for the PSCCH-PSSCH transmission occasion.

4. The method of claim 3, wherein the pathloss includes at least one of a pathloss between the first device and the second device or a pathloss between the first device and a base station.

5. The method of claim 1, wherein the first power is determined based on a subcarrier spacing, a pathloss, and the number of resource blocks for the PSCCH-PSSCH transmission occasion.

6. The method of claim 1, wherein the first power is determined as a smallest value among a maximum transmit power configured for the first device, a channel busy ratio (CBR)-based maximum transmit power, and a third power.

7. The method of claim 6, wherein the third power is determined as:

$$\text{third power} = 10\log_{10}(2^u N) + P_O + \alpha \cdot \text{PL}$$

wherein the u is subcarrier spacing, the N is the number of resource blocks for the PSCCH-PSSCH transmission occasion, the $P_O$ is a value configured for the first device, and the $\alpha$ is a value configured for the first device, and the PL is a pathloss between the first device and the second device or a pathloss between the first device and a base station.

8. The method of claim 1, further comprising:
    transmitting, to the second device, a reference signal,
    wherein transmit power of the reference signal is determined based on a number of antenna ports used for transmission of the reference signal.

9. The method of claim 8, wherein the reference signal includes at least one of channel state information (CSI)-reference signal (RS) or phase tracking (PT)-reference signal (RS).

10. The method of claim 8, wherein transmit power of the reference signal transmitted through one antenna port is 3 dB greater than transmit power of the reference signal transmitted through two antenna ports.

11. A first device configured to perform wireless communication, the first device comprising:
- at least one transceiver;
- at least one processor; and
- at least one memory connected to the at least one processor and storing instructions that, based on being executed, cause the at least one processor to perform operations comprising:
- determining a first power for physical sidelink shared channel (PSSCH) transmission in symbols in which a physical sidelink control channel (PSCCH) related to the PSSCH transmission is not transmitted in PSCCH-PSSCH transmission occasion;
- after the determination of the first power, determining a second power for PSCCH transmission in symbols in which the PSCCH related to the PSSCH transmission is transmitted in the PSCCH-PSSCH transmission occasion as:

$$\text{second power} = 10\log_{10}\left(\frac{M}{N}\right) + \text{first power}$$

wherein the M is a number of resource blocks for the PSCCH transmission in the PSCCH-PSSCH transmission occasion, and the N is a number of resource blocks for the PSCCH-PSSCH transmission occasion;
- performing to a second device, the PSCCH transmission based on the second power; and
- performing to the second device, the PSSCH transmission based on the first power.

12. The first device of claim 11, wherein the symbols in which the PSCCH related to the PSSCH transmission is not transmitted and the symbols in which the PSCCH related to the PSSCH transmission is transmitted are in the PSCCH-PSSCH transmission occasion.

13. The first device of claim 11, wherein the first power is determined based on a pathloss and the number of resource blocks for the PSCCH-PSSCH transmission occasion.

14. The first device of claim 13, wherein the pathloss includes at least one of a pathloss between the first device and the second device or a pathloss between the first device and a base station.

15. The first device of claim 11, wherein the first power is determined based on a subcarrier spacing, a pathloss, and the number of resource blocks for the PSCCH-PSSCH transmission occasion.

16. A processing device configured to control a first device, the processing device comprising:
- at least one processor; and
- at least one memory connected to the at least one processor and storing instructions that, based on being executed, cause the at least one processor to perform operations comprising:
- determining a first power for physical sidelink shared channel (PSSCH) transmission in symbols in which a physical sidelink control channel (PSCCH) related to the PSSCH transmission is not transmitted in PSCCH-PSSCH transmission occasion;
- after the determination of the first power, determining a second power for PSCCH transmission in symbols in which the PSCCH related to the PSSCH transmission is transmitted in the PSCCH-PSSCH transmission occasion as:

$$\text{second power} = 10\log_{10}\left(\frac{M}{N}\right) + \text{first power}$$

wherein the M is a number of resource blocks for the PSCCH transmission in the PSCCH-PSSCH transmission occasion, and the N is a number of resource blocks for the PSCCH-PSSCH transmission occasion;
- performing to a second device, the PSCCH transmission based on the second power; and
- performing to the second device, the PSSCH transmission based on the first power.

17. The processing device of claim 16, wherein the symbols in which the PSCCH related to the PSSCH transmission is not transmitted and the symbols in which the PSCCH related to the PSSCH transmission is transmitted are in the PSCCH-PSSCH transmission occasion.

18. The processing device of claim 16, wherein the first power is determined based on a pathloss and the number of resource blocks for the PSCCH-PSSCH transmission occasion.

19. The processing device of claim 18, wherein the pathloss includes at least one of a pathloss between the first device and the second device or a pathloss between the first device and a base station.

20. The processing device of claim 16, wherein the first power is determined based on a subcarrier spacing, a pathloss, and the number of resource blocks for the PSCCH-PSSCH transmission occasion.

* * * * *